(12) United States Patent
Bergstrom et al.

(10) Patent No.: US 9,805,333 B1
(45) Date of Patent: Oct. 31, 2017

(54) GENERATING A MAXIMUM-PROFIT SOLUTION FOR A MERCHANDIZING FIXTURE

(71) Applicant: WALGREEN CO., Deerfield, IL (US)

(72) Inventors: John Bergstrom, Palatine, IL (US); David Pisinger, Frederiksberg (DK)

(73) Assignee: WALGREEN CO., Deerfield, IL (US)

( * ) Notice: Subject to any disclaimer, the term of this patent is extended or adjusted under 35 U.S.C. 154(b) by 0 days.

(21) Appl. No.: 13/838,165

(22) Filed: Mar. 15, 2013

Related U.S. Application Data

(62) Division of application No. 12/773,617, filed on May 4, 2010.

(51) Int. Cl.
G06Q 10/00 (2012.01)
G06Q 10/08 (2012.01)

(52) U.S. Cl.
CPC .................................. *G06Q 10/087* (2013.01)

(58) Field of Classification Search
None
See application file for complete search history.

(56) References Cited

U.S. PATENT DOCUMENTS

| | | |
|---|---|---|
| 3,705,410 A | 12/1972 | Kooy et al. |
| 5,029,098 A | 7/1991 | Levasseur |
| 6,256,615 B1 | 7/2001 | Goodwin, III |
| 6,341,269 B1 | 1/2002 | Dulaney et al. |
| 6,366,890 B1 | 4/2002 | Usrey |
| 6,473,984 B1 | 11/2002 | Splain et al. |
| 6,526,373 B1 | 2/2003 | Barral |
| 6,922,706 B1 | 7/2005 | Kurtzberg et al. |
| 7,440,903 B2 | 10/2008 | Riley et al. |
| 7,957,998 B2 | 6/2011 | Riley et al. |
| 2001/0047293 A1 | 11/2001 | Waller et al. |
| 2002/0156667 A1 | 10/2002 | Bergstrom |
| 2003/0014291 A1 | 1/2003 | Kane et al. |

(Continued)

OTHER PUBLICATIONS

"Sap® Retail Merchandise and Assortment Planning," mySAP Retail Brief, 4 pages.

(Continued)

*Primary Examiner* — Shay S Glass
*Assistant Examiner* — Russell S. Glass
(74) *Attorney, Agent, or Firm* — Marshall, Gerstein & Borun LLP; Randall G. Rueth

(57) ABSTRACT

A method in a computer system for selecting an efficient combination of items for placement on a merchandizing fixture, wherein each item has a respective size, and wherein each combination of items has a respective profitability metric; including electronically receiving an indication of a size of the merchandizing fixture; electronically receiving a business rule indicative of whether gaps on the merchandizing fixture are allowed; when gaps on the merchandizing fixture are allowed, automatically selecting via a computer processor a combination of items that has a highest profitability metric and that fits on the merchandizing fixture without occupying the entire merchandizing fixture; and when gaps on the merchandizing fixture are not allowed, automatically selecting via a computer processor a combination of items that has a highest profitability and occupies the entire merchandizing fixture without exceeding the size of the merchandizing fixture.

12 Claims, 22 Drawing Sheets

(56) References Cited

U.S. PATENT DOCUMENTS

| | | |
|---|---|---|
| 2003/0083925 A1 | 5/2003 | Weaver et al. |
| 2003/0154141 A1 | 8/2003 | Capazario et al. |
| 2003/0171978 A1 | 9/2003 | Jenkins et al. |
| 2003/0171979 A1 | 9/2003 | Jenkins |
| 2003/0200129 A1 | 10/2003 | Klaubauf et al. |
| 2003/0216969 A1 | 11/2003 | Bauer et al. |
| 2004/0010438 A1 | 1/2004 | Tornaquindici |
| 2004/0133483 A1 | 7/2004 | Potter et al. |
| 2005/0114196 A1 | 5/2005 | Schoenmeyr |
| 2005/0203790 A1 | 9/2005 | Cohen |
| 2005/0256726 A1 | 11/2005 | Benson et al. |
| 2006/0149634 A1 | 7/2006 | Pelegrin et al. |
| 2007/0027745 A1 | 2/2007 | Ouimet |
| 2007/0050235 A1 | 3/2007 | Ouimet |
| 2007/0288296 A1 | 12/2007 | Lewis |
| 2008/0147475 A1 | 6/2008 | Gruttadauria |
| 2008/0208719 A1 | 8/2008 | Sharma et al. |
| 2009/0043676 A1 | 2/2009 | Riley et al. |
| 2009/0059270 A1 | 3/2009 | Opalach et al. |
| 2009/0271245 A1 | 10/2009 | Joshi et al. |
| 2010/0217681 A1 | 8/2010 | Geikie et al. |
| 2010/0318403 A1 | 12/2010 | Bottom |
| 2011/0035257 A1 | 2/2011 | Solanki et al. |
| 2011/0276364 A1 | 11/2011 | Bergstrom et al. |
| 2012/0022913 A1 | 1/2012 | Volkmann et al. |
| 2014/0067467 A1 | 3/2014 | Rangarajan et al. |
| 2014/0129354 A1 | 5/2014 | Soon-Shiong |

OTHER PUBLICATIONS

Non-final Office Action for U.S. Appl. No. 12/773,617 dated Aug. 30, 2012.
Final Office Action for U.S. Appl. No. 12/773,617 dated May 23, 2013.
Non-Final Office Action for U.S. Appl. No. 13/838,552, dated Sep. 12, 2016.
Non-Final Office Action for U.S. Appl. No. 13/839,340, dated Sep. 23, 2016.
Non-Final Office Action for U.S. Appl. No. 13/842,858, dated Sep. 9, 2016.
Non-Final Office Action for U.S. Appl. No. 12/773,617, dated Dec. 12, 2016.
Final Office Action for U.S. Appl. No. 12/773,617, dated Jul. 22, 2015.
Non-final Office Action for U.S. Appl. No. 12/773,617, dated Dec. 2, 2014.
Non-final Office Action for U.S. Appl. No. 13/837,142, dated Jun. 18, 2015.
Non-final Office Action for U.S. Appl. No. 13/837,329, dated Jun. 17, 2015.
Non-final Office Action for U.S. Appl. No. 13/838,552, dated Jun. 16, 2015.
Non-final Office Action for U.S. Appl. No. 13/839,340, dated May 21, 2015.
Non-final Office Action for U.S. Appl. No. 13/842,858, dated May 28, 2015.
Pisinger, D., Algorithms for knapsack problems, Dept. of Computer Science, University of Copenhagen, Ph.D. Thesis, 1-200(1995).
Final Office Action for U.S. Appl. No. 13/837,142, dated Feb. 19, 2016.
Final Office Action for U.S. Appl. No. 13/837,329, dated Feb. 19, 2016.
Final Office Action for U.S. Appl. No. 13/838,552, dated Feb. 22, 2016.
Final Office Action for U.S. Appl. No. 13/839,340, dated Feb. 23, 2016.
Final Office Action for U.S. Appl. No. 13/842,858, dated Nov. 23, 2015.
Advisory Action for U.S. Appl. No. 13/842,858, dated Feb. 22, 2016.

| | | ITEM A SUPPLY | | | | | | | | | | | | | | | | | | | |
|---|---|---|---|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 | 16 | 17 | 18 | 19 | 20 |
| ITEM B SUPPLY | 0 | 0 | 1 | 2 | 3 | 4 | 5 | 6 | 7 | 8 | 9 | 10 | 11 | 12 | 13 | 14 | | | | | | |
| | 1 | 0 | 1 | 2 | 3 | 4 | 5 | 6 | 7 | 8 | 9 | 10 | 11 | 12 | 13 | 14 | | | | | | |
| | 2 | 0 | 1 | 2 | 3 | 4 | 5 | 6 | 7 | 8 | 9 | 10 | 11 | 12 | 13 | 14 | | | | | | |
| | 3 | 0 | 1 | 2 | 3 | 4 | 5 | 6 | 7 | 8 | 9 | 10 | 11 | 12 | 13 | 14 | 15 | | | | | |
| | 4 | 0 | 1 | 2 | 3 | 4 | 5 | 6 | 7 | 8 | 9 | 10 | 11 | 12 | 13 | 14 | | | | | | |
| | 5 | 0 | 1 | 2 | 3 | 4 | 5 | 6 | 7 | 8 | 9 | 10 | 11 | 12 | 13 | 14 | | | | | | |
| | 6 | 0 | 1 | 2 | 3 | 4 | 5 | 6 | 7 | 8 | 9 | 10 | 11 | 12 | 13 | 14 | 14 | 14 | 14 | 14 | 14 | 14 |
| | 7 | 0 | 1 | 2 | 3 | 4 | 5 | 6 | 7 | 8 | 9 | 10 | 11 | 12 | 13 | 13 | 13 | 13 | 13 | 13 | 13 | 13 |
| | 8 | 0 | 1 | 2 | 3 | 4 | 5 | 6 | 7 | 8 | 9 | 10 | 11 | 12 | 12 | 12 | 12 | 12 | 12 | 12 | 12 | 12 |
| | 9 | 0 | 1 | 2 | 3 | 4 | 5 | 6 | 7 | 8 | 9 | 10 | 11 | 12 | | | | | | | | |
| | 10 | 0 | 1 | 2 | 3 | 4 | 5 | 6 | 7 | 8 | 9 | 10 | 11 | 12 | | | | | | | | |
| | 11 | 0 | 1 | 2 | 3 | 4 | 5 | 6 | 7 | 8 | 9 | 10 | 11 | 12 | | | | | | | | |
| | 12 | 0 | 1 | 2 | 3 | 4 | 5 | 6 | 7 | 8 | 9 | 10 | 11 | 12 | | | | | | | | |
| | 13 | 0 | 1 | 2 | 3 | 4 | 5 | 6 | 7 | 8 | 9 | 10 | 11 | 12 | | | | 12 | | | | |
| | 14 | 0 | 1 | 2 | 3 | 4 | 5 | 6 | 7 | 8 | 9 | 10 | 11 | 12 | | | | | | | | |
| | 15 | 0 | 1 | 2 | 3 | 4 | 5 | 6 | 7 | 8 | 9 | 10 | 11 | 12 | | | | | | | | |
| | 16 | 0 | 1 | 2 | 3 | 4 | 5 | 6 | 7 | 8 | 9 | 10 | 11 | 12 | | | | | | | | |
| | 17 | 0 | 1 | 2 | 3 | 4 | 5 | 6 | 7 | 8 | 9 | 10 | 11 | 12 | | | | | | | | |
| | 18 | 0 | 1 | 2 | 3 | 4 | 5 | 6 | 7 | 8 | 9 | 10 | 11 | 12 | | | | | | | | |
| | 19 | 0 | 1 | 2 | 3 | 4 | 5 | 6 | 7 | 8 | 9 | 10 | 11 | 12 | | | | | | | | |
| | 20 | 0 | 1 | 2 | 3 | 4 | 5 | 6 | 7 | 8 | 9 | 10 | 11 | 12 | | | | | | | | |

*FIG. 5A*

|   | ITEM A SUPPLY |
|---|---|
|   | 0 1 2 3 4 5 6 7 8 9 10 11 12 13 14 15 16 17 18 19 20 |
| 0 | 0 0 0 0 0 0 0 0 0 0 0 0 0 0 0 0 0 0 0 0 0 |
| 1 | 1 1 1 1 1 1 1 1 1 1 1 1 1 1 1 1 1 1 1 1 1 |
| 2 | 2 2 2 2 2 2 2 2 2 2 2 2 2 2 2 2 2 2 2 2 2 |
| 3 | 3 3 3 3 3 3 3 3 3 3 3 2 3 3 3 3 3 3 3 3 3 |
| 4 | 4 4 4 4 4 4 4 4 4 4 4 4 4 4 4 4 4 4 4 4 4 |
| 5 | 5 5 5 5 5 5 5 5 5 5 5 5 5 5 5 5 5 5 5 5 5 |
| 6 | 6 6 6 6 6 6 6 6 6 6 6 6 6 6 6 6 6 6 6 6 6 |
| 7 | 7 7 7 7 7 7 7 7 7 7 7 7 7 7 7 7 7 7 7 7 7 |
| 8 | 8 8 8 8 8 8 8 8 8 8 8 8 8 8 8 8 8 8 8 8 8 |
| 9 | 9 9 9 9 9 9 9 9 9 9 9 9 8 |
| 10 | 10 10 10 10 10 10 10 10 10 10 10 9 8 |
| 11 | 11 11 11 11 11 11 11 11 11 11 10 9 8 |
| 12 | 12 12 12 12 12 12 12 12 12 11 10 9 8 |
| 13 | 13 13 13 13 13 13 13 13 12 11 10 9 8 |
| 14 | 14 14 14 14 14 14 14 13 12 11 10 9 8 |
| 15 | 15 15 15 15 15 15 12 13 12 11 10 9 8 |
| 16 | 16 16 16 16 16 15 14 13 12 11 10 9 8 |
| 17 | 15 14 13 12 11 10 9 8 |
| 18 | 15 14 13 12 11 10 9 8 |
| 19 | 15 14 13 12 11 10 9 8 |
| 20 | 15 14 13 12 11 10 9 8 |

*FIG. 5B*

TOTAL SALES

| $M_t$ / ITEM B SUPPLY \ ITEM A SUPPLY | 0 | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|---|
| 0 | 0 | 1 | 2 | 3 | 4 | 5 | 6 | 7 | 8 | 9 | 10 | 11 | 12 | 13 | 14 | 15 | 15 | 15 | 15 | 15 | 15 |
| 1 | 1 | 2 | 3 | 4 | 5 | 6 | 7 | 8 | 9 | 10 | 11 | 12 | 13 | 14 | 15 | 16 | 16 | 16 | 16 | 16 | 16 |
| 2 | 2 | 3 | 4 | 5 | 6 | 7 | 8 | 9 | 10 | 11 | 12 | 13 | 14 | 15 | 16 | 17 | 17 | 17 | 17 | 17 | 17 |
| 3 | 3 | 4 | 5 | 6 | 7 | 8 | 9 | 10 | 11 | 12 | 13 | 14 | 15 | 16 | 17 | 18 | 18 | 18 | 18 | 18 | 18 |
| 4 | 4 | 5 | 6 | 7 | 8 | 9 | 10 | 11 | 12 | 13 | 14 | 15 | 16 | 17 | 18 | 19 | 19 | 19 | 19 | 19 | 19 |
| 5 | 5 | 6 | 7 | 8 | 9 | 10 | 11 | 12 | 13 | 14 | 15 | 16 | 17 | 18 | 19 | 20 | 20 | 20 | 20 | 20 | 20 |
| 6 | 6 | 7 | 8 | 9 | 10 | 11 | 12 | 13 | 14 | 15 | 16 | 17 | 18 | 19 | 20 | | | | | | |
| 7 | 7 | 8 | 9 | 10 | 11 | 12 | 13 | 14 | 15 | 16 | 17 | 18 | 19 | 20 | | | | 20 | | | |
| 8 | 8 | 9 | 10 | 11 | 12 | 13 | 14 | 15 | 16 | 17 | 18 | 19 | 20 | | | | | | | | |
| 9 | 9 | 10 | 11 | 12 | 13 | 14 | 15 | 16 | 17 | 18 | 19 | 20 | | | | | | | | | |
| 10 | 10 | 11 | 12 | 13 | 14 | 15 | 16 | 17 | 18 | 19 | 20 | | | | | | | | | | |
| 11 | 11 | 12 | 13 | 14 | 15 | 16 | 17 | 18 | 19 | 20 | | | | | | | | 20 | | | |
| 12 | 12 | 13 | 14 | 15 | 16 | 17 | 18 | 19 | 20 | | | | | | | | | | | | |
| 13 | 13 | 14 | 15 | 16 | 17 | 18 | 19 | 20 | | | | | | | | | | | | | |
| 14 | 14 | 15 | 16 | 17 | 18 | 19 | 20 | | | | | | | | | | | | | | |
| 15 | 15 | 16 | 17 | 18 | 19 | 20 | | | | | | | | | | | | | | | |
| 16 | 16 | 17 | 18 | 19 | 20 | | | | | | | | | | | | | | | | |
| 17 | 16 | 17 | 18 | 19 | 20 | | | | 20 | | | | | | | | | | | | |
| 18 | 16 | 17 | 18 | 19 | 20 | | | | | | | | | | | | | | | | |
| 19 | 16 | 17 | 18 | 19 | 20 | | | | | | | | | | | | | | | | |
| 20 | 16 | 17 | 18 | 19 | 20 | | | | | | | | | | | | | | | | |

GENERATING A MAXIMUM-PROFIT SOLUTION FOR A MERCHANDIZING FIXTURE

CROSS-REFERENCE TO RELATED APPLICATIONS

The present application is a divisional application of U.S. application Ser. No. 12/773,617, entitled "Method and System for Optimizing Store Space and Item Layout," filed May 4, 2010 and which is hereby incorporated by reference herein in its entirety.

FIELD AND BACKGROUND OF THE DISCLOSURE

Field of the Disclosure

This disclosure relates generally to optimizing store space and, in particular, to developing efficient assortment and merchandizing fixture layout for a plurality of items.

Background Description

To increase profits and improve customer experience, retailers often develop diagrams that specify where and in what quantity items should be placed on shelves, in slots of vending machine, or on a sales floor. These diagrams are known as planograms or POGs. In general, the development of a planogram includes generating a selection of items for inclusion in a planogram (known as product assortment), and determining relative placement of these items within the planogram (known as item layout). While a relatively effective planogram for two or three items may be generated manually by simply trying various combinations and relying on subjective judgment, developing a planogram for tens or hundreds of items is a highly complicated task.

Generally speaking, planogram development is difficult due to numerous factors that affect the profitability of a particular arrangement of items. For example, shelf or floor space is typically limited, items usually have different physical dimensions, shelves often vary in width and depth, the sale of different items generates different profits, etc. Moreover, retails may have numerous requirements with respect to certain items such as mandatory presence on a shelf, restrictions on how proximate certain items may be relative to other items, requirements that heavy items must be placed on lower shelves, etc. Legal restrictions on item assortment may also apply in certain situations, e.g., a restriction on sale of toy guns in California. Further, restrictions may also apply to groups or categories of items.

In addition to multiple parameters with which items may be associated, and various restrictions or rules that may apply to the items individually or collectively, selection and placement of items in a retail area may result in different aesthetic effects due to color schemes, positioning of items relative to each other, etc. Also, the quality of a shopping experience may be affected by how easily a customer can locate a desired item or a suitable substitute on a shelf, how comfortable a customer is when browsing the selection, and similar factors.

In another aspect, customers often select an item from among several similar selections. Thus, by selecting a certain item on a shelf, a customer often foregoes another one or several selections. Further, when a customer cannot find the desired item on the shelf, he or she may purchase a substitute, while another customer will not accept a substitute and will not make a purchase at all. For these reasons, developing an efficient planogram that satisfies every relevant rule, generates a high profit, and addresses customers' needs remains very complicated.

BRIEF SUMMARY OF THE DISCLOSURE

A computer system receives a description of a group of items including a set of spatial, financial, and other parameters for each item. The computer system further receives item interaction data descriptive of which items compete with each other, which items are bought together (i.e., display affinity), etc. to groups some items together as choice sets. Also, the computer system receives business rules that require or invalidate certain combinations of items, mandate placement of certain items in specified quantities on the shelves, and generally specify requirements on the level of an individual item or a choice set. The computer system may also receive historical data that includes transfer probabilities, i.e., probabilities that a customer who prefers a certain item purchases a specified other item instead. Further, the computer system may receive a set of parameters of an area, such as a retail area, for example, to hold the assortment of items. In an embodiment, the parameters include spatial constraints for each sub-area (e.g., a merchandizing fixture such as a store shelf) associated with the area. Using the received data, the computer system generates an efficient assortment of items that optimizes the overall expected profit. In at least some of the embodiments, the computer system further generates a layout of the assortment.

In at least some of the embodiments, the system includes a choice set generator to obtain several choice sets, each including multiple items, at least some of which are substitutable. In an embodiment, the system also includes a choice set splitter to reduce a size of some of the larger choice set by splitting these sets according to a specified criterion. The system further includes a facing combination generator to enumerate possible facings in each choice set, and a profit calculator to calculate the amount of expected profit for each facing combination.

In some embodiments, the profit calculator implements one or several of a linear programming technique, simulation with full replacement, and simulation with partial replacement. The linear programming technique may be consistent with a greedy optimization approach. The simulation technique may involve executing multiple iterations of a simulated arrival of a group of customers, attempted selection of a preferred item by each customer, and a selection of a replacement item if the primary selection is unavailable. The selection of the replacement item may be simulated using transfer probabilities and historical sales data.

In at least some of the embodiments, the system further includes components to format profit and space-constraint metrics for each facing combination in accordance with a generic optimization problem, and to solve the problem using a suitable mathematical technique such as a knapsack problem solution. The system may further include a multiple knapsack problem to optimally break up the solution for the general area constraint into several solutions for each sub-area, e.g., shelf.

In some embodiments, the system further includes a layout optimizer to improve the layout of the generated assortment. The layout optimizer may include a first component to efficiently block (place close together) items in accordance with a set of business rules, and a second component to sort the items within each block or across blocks, if desired. The layout optimizer may further include a control to adjust the layout in view of shoppability and profitability of the items.

In one embodiment, a method in a computer system for generating an efficient item assortment associated with a plurality of items includes obtaining choice set data specifying a multiplicity of choice sets associated with the plurality of items, such that each of the multiplicity of choice sets includes several of the plurality of items, at least some of which are mutually substitutable, obtaining item interaction data descriptive of substitutions between pairs of items in each of the multiplicity of choice sets, obtaining a set of benefit metrics associated with the plurality of items, obtaining a constraint parameter associated with the item assortment, and generating an item selection based at least on the item interaction data, the set of benefit metrics, and the constraint parameter; where the item selection identifies at least one of the plurality of items selected for inclusion in the item assortment.

In another embodiment, a system for generating an efficient item assortment associated with a plurality of items includes a storage unit to store a plurality of profit metrics, such that each of the plurality of profit metrics corresponds to a respective one of the plurality of items, a choice set generator to generate choice set data specifying a multiplicity of choice sets associated with the plurality of items, where each of the multiplicity of choice sets includes several of the plurality of items, at least some of which are mutually substitutable, a demand transfer matrix generator to receive item interaction data descriptive of substitutions between pairs of items in each of the multiplicity of choice sets, and to generate a respective demand transfer matrix for each of the multiplicity of choice sets to define a set of demand transfer matrices, where each demand transfer matrix includes a respective substitutability metric for each pair of items in the corresponding choice set, and a combinatorial problem solver communicatively coupled to the storage unit, the choice set generator, and the demand transfer matrix generator to obtain a global constraint parameter and to generate an item selection based at least one on the set of demand transfer matrices, the plurality of profit metrics, and the global constraint parameter.

In another embodiment, a method in a computer system for generating an efficient item assortment associated with a plurality of items, to be disposed in a retail area having a plurality of regions, includes receiving item data that includes, for each of the plurality of items, a first metric associated with a physical parameter of the item and a second metric indicative of profitability of the item, receiving retail region data that includes a plurality of metrics, where each of the plurality of metrics is associated with the physical parameter of a respective of the plurality of regions, receiving choice set data specifying a multiplicity of choice sets, where each of the multiplicity of choice sets includes several of the plurality of items, at least some of which are mutually substitutable, receiving item interaction data that includes, for each of the multiplicity of choice sets, a metric of substitutability between items in the corresponding choice set, generating a multiplicity of lists of facing combinations, where each of the multiplicity of lists corresponds to a respective one of the multiplicity of choice sets, and where each facing combination in each of the multiplicity of lists includes one or several facings of at least one of the items in the corresponding one of the multiplicity of choice sets, calculating at least a profit metric and a physical parameter metric for each facing combination in each of the multiplicity of lists of facing combinations based on the first metric and the second metric of each item included in the facing combination and the interaction data associated with the corresponding choice set, and selecting zero or more facing combinations from each of the multiplicity of lists of facing combinations to generate a selection so as to maximize a total profit associated with the selection in view of the retail region data and the first metric of each item included in the selection.

In another embodiment, a method in a computer system for generating an efficient item assortment associated with a plurality of items includes obtaining a first plurality of parameters, where each of the first plurality of parameters includes a benefit metric of a respective one of the plurality of items, obtaining a constraint parameter associated with the item assortment, generating a plurality of facing combinations, each including one or more facings of one or more of the plurality of items, generating a second plurality of parameters using the first plurality of parameters, where each of the second plurality of parameters includes a benefit metric of a respective one of the plurality of facing combinations, applying a function of the second plurality of parameters, subject to a limitation associated with the constraint parameter, to generate an optimization result, and generating an item selection based on the optimization result. In one operational mode consistent with this embodiment, the constraint parameter is a particular value. In another operational mode, the constraint parameter is a range of values. Further, in some operational modes, applying the function includes maximizing the function to identify the maximum value for the obtained constraint parameter. In another mode, applying the function includes generating multiple values consistent with the constraint parameter, and the optimization result accordingly includes multiple values through which an item selection can be generated.

In another embodiment, a method in a computer system for generating an efficient item assortment associated with a plurality of items, to be disposed in a retail area having a plurality of regions, includes obtaining a first plurality of parameters, where each of the first plurality of parameters is associated with a respective one of the plurality of items and includes a benefit metric of the respective one of the plurality of items indicative of a financial benefit associated with a sale of one unit of the respective one of the plurality of items, and a spatial metric of the respective one of the plurality of items specifying one of length, width, or height of the respective one of the plurality of items, obtaining a plurality of spatial metrics, each of the plurality of spatial metrics corresponding to a respective one of the plurality of regions of the retail area, obtaining choice set data specifying a multiplicity of choice sets associated with the plurality of items, generating a plurality of facing combinations in accordance with the choice set data, where each of the plurality of facing combinations includes one or more facings of one or more items of a respective one of the multiplicity of choice sets, generating a second plurality of parameters using the first plurality of parameters, where each of the second plurality of parameters corresponds to a respective one of the plurality of facing combinations and includes a benefit metric of the respective one of the plurality of facing combinations indicative of an expected financial benefit associated with including the respective one of the plurality of facing combinations in the item assortment, and a spatial metric of the respective one of the plurality of facing combinations specifying one of length, width, or height of the respective one of the plurality of facing combinations, maximizing a function of the benefit metrics of the second plurality of parameters, subject to a limitation associated with the plurality of spatial metrics, to generate an optimization result, and generating an item selection based on the optimization result.

BRIEF DESCRIPTION OF THE DRAWINGS

FIG. 5A is a matrix that specifies projected sales of a first item for various numbers of supplied units of the first item and the second item.

FIG. 5B is a matrix that specifies projected sales of the second item for various numbers of supplied units of the first item and the second item used in generating the matrix illustrated in FIG. 5A.

FIG. 5C is a matrix that specifies projected combined sales of the items used in generating the matrices of FIGS. 5A and 5B.

FIG. 14A is a block diagram that schematically illustrates an example random layout of several items.

FIG. 14B is a block diagram of a layout of the items of FIG. 14A which has been generated using the techniques described herein.

DETAILED DESCRIPTION OF THE EMBODIMENTS

Figure 1:
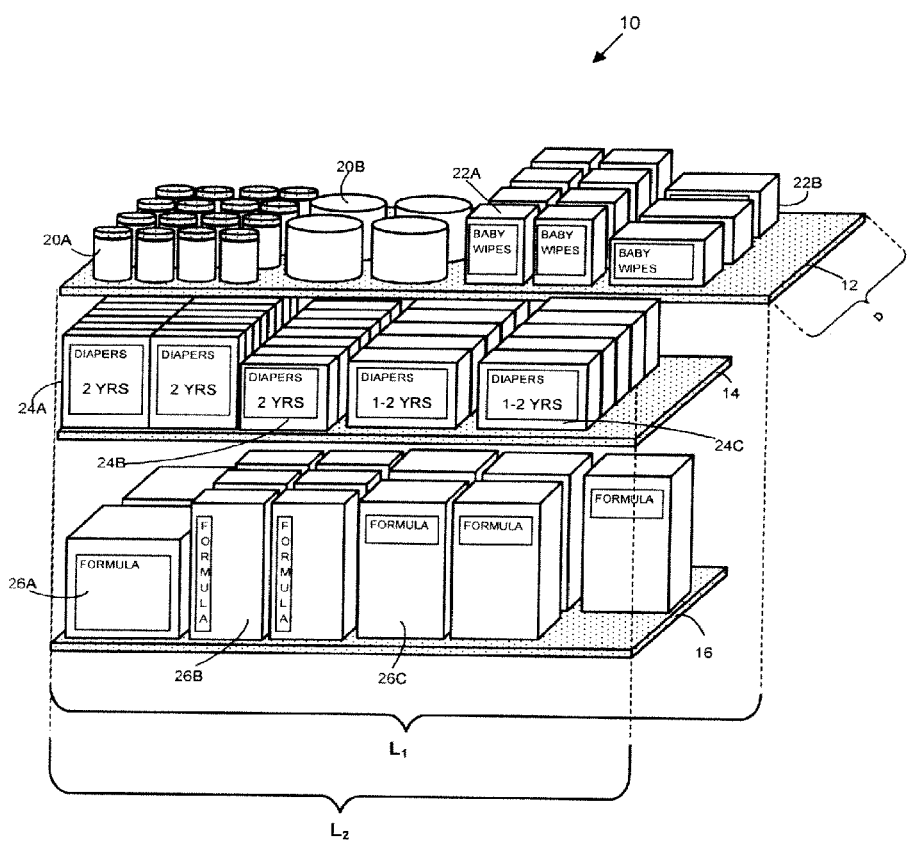
FIG. 1 illustrates an example arrangement of several items in a retail area that includes several shelves.

FIG. 1 illustrates a certain arrangement of items on a longer shelf 12 and two shorter shelves 14 and 16 in a retail area 10. In general, the retail area 10 may include any number of merchandizing fixtures (e.g., shelves, racks, gridwall panels) of the same or different width, and the items may be any types of products packaged in any desired manner. By way of example, however, FIG. 1 depicts several baby care items packaged in rectangular boxes or round (tubular) containers. In particular, several small containers 20A and several large containers 20B may contain baby powder, boxes 22A and 22B may contain two respective brands of baby wipes, boxes 24A-C may contain diapers for different ages of one or several brands, and cartons 26A-C may contain infant formula from several manufacturers. The containers 20A-B and boxes 22A-B are placed on the upper shelf 12 in this example configuration, boxes 24A-C are on the second shelf 14, and the 26A-C are on the bottom shelf 16. The upper shelf 12 has the width $L_1$ greater than the width $L_2$ of the shelves 14 and 16, and each of the shelves 12-16 has the same depth D.

An occurrence of an item on a merchandizing fixture such as a shelf along a dimension exposed to customers may be referred to as a facing. Thus, a certain product may have two facings on a shelf, with each facing corresponding to at most five instances of the product that can fit behind each other on the shelf. This maximum number of items that can be associated with a single facing on a particular shelf may be referred to as facing capacity, and the number of times a facing is replenished within a certain time interval may be referred to as the replenishment frequency of the facing.

In the example arrangement of baby care items depicted in FIG. 1, the retail area 10 includes four facings of small containers 20A, three facings of the cartons 26C, two facings of each of the large containers 20B, the boxes 24A and 24C, and cartons 26B, and one facing of each of the boxes 22B and 24B, and cartons 26A. As illustrated in FIG.

1, each facing of the item 20A-26C is associated with a respective number of units of the item that can fit on one of the shelves 12-16 in a single column, defining the corresponding facing capacity of the item for the shelf depth D. Thus, the large containers 20B have the facing capacity of 2, and the boxes 24A, 24B, and 24C on the middle shelf 14 have respective facing capacities of 8, 7, and 5, for example.

Applying the assortment selection and optimization techniques discussed below, the selection and placement of items 20A-26C in the retail area 10 may be optimized so as to generate the maximum amount of profit from the sale of these items. In particular, a system such as an assortment and layout optimization system depicted in FIG. 3 may develop several choice sets as sets of items within the group of items 20A-26C in which member items may serve as alternatives to other items in the set. The system may then determine and quantify interactions among the items in each choice set to develop a demand model. Using the demand model, and in view of various item attributes, the system may further develop a profit model to generate metrics of profitability for various combinations of facings. In particular, the system may consider spatial dimensions (e.g., length/diameter, width), financial attributes (e.g., gross unit profit, net unit profit), item-specific business requirements (e.g., mandatory presence, minimum and maximum number of facings of the item, minimum and maximum number of units of the item in the retail space), and other parameters of the items 20A-26C when developing the profit model. The system may then apply the profit model to generate several item combinations and the corresponding profit and spatial metrics for each choice set, represent the generated data in a format consistent with an input to a combinatorial optimization problem such as the so-called knapsack problem, and generate a solution to the combinatorial problem within the specified boundaries. More specifically, the solution specifies an optimal assortment of items for each shelf in the retail area 10 to maximize the profit from the sale of at least some of the items 20A-26C. As is known, a knapsack problem in general involves a global constraint and a set of elements, each having a certain constraint metric and a benefit metric, and attempts to select elements from the set so as to maximize the benefit without exceeding the global constraint. In at least some of the embodiments, the system further optimizes the layout of the selected facings in response to a user selecting shoppability and profitability levels. In some of these embodiments, the system applies simulated annealing techniques.

Next, an example system that may implement the techniques for optimizing product assortment (such as those outlined above) is discussed with reference to FIG. 2, and various aspects of theses techniques are discussed with reference to FIGS. 3-5D. Some of the components illustrated in FIG. 2, along with the associated methods and several example applications of these methods, are then illustrated in more detail in FIGS. 6A-14.

Figure 2:
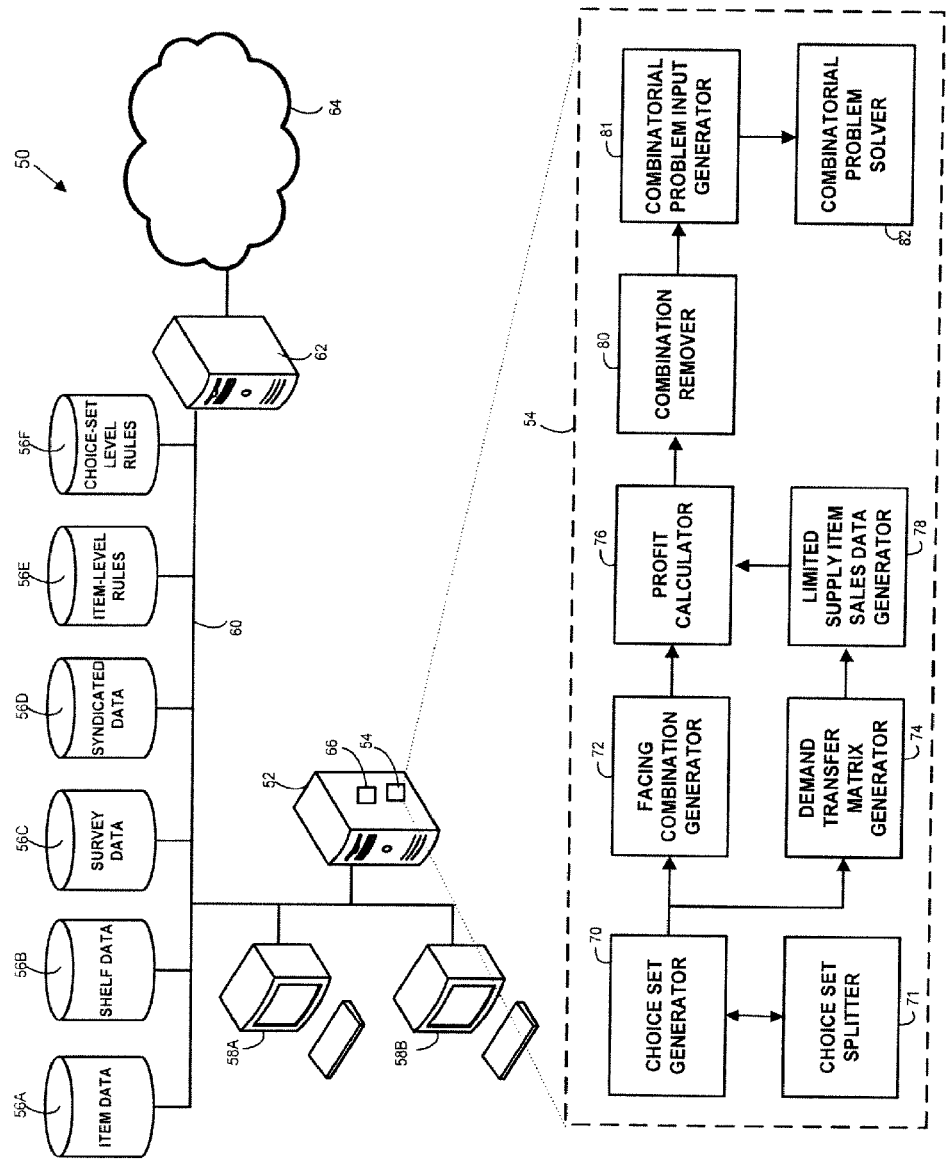
FIG. 2 is a block diagram of an example system that implements the techniques for assortment optimization of the present disclosure.

Referring to FIG. 2, an optimization system 50 may include a processing unit 52 that implements an assortment development engine 54, also illustrated in FIG. 2 in an exploded view. The processing unit 52 generally may be any type of a device having a processor. In some embodiments, the optimization system 50 may include multiple processing units 52, and the assortment development engine 54 may be implemented in a distributed manner on some or all of these processing units. The assortment development engine 54 may be a set of instructions stored in a computer-readable memory. In one embodiment, the processing unit 52 includes a memory unit such as a hard drive, and assortment development engine 54 is a software system stored at least partially on the hard drive of the processing unit 52.

The optimization system 50 may also include one or several storage units 56A-F to store data related to the items 20A-26C (as well as other items which may not be included in a planogram for the retail area 10), parameters of the retail space 10, and other relevant information. For clarity of illustration, FIG. 2 depicts each of the storage units 56A-F as a separate entity. However, it will be noted that although the storage units 56A-F in some embodiments may be databases implemented on respective physical devices, the data units 56A-F may also be implemented as separate tables or groups of tables in a single database, as files in the memory of the processing unit 52, or in any other suitable manner. Moreover, in some embodiments, item and shelf parameters used by the optimization system 50 are not stored in a permanent memory at all, and are retained only temporarily in a volatile memory such as a RAM, for example.

The item data storage unit 56A may store item data that includes a width metric for each item. To take one specific example, the items 24A-C on the shelf 14 may have the respective widths of 5, 3, and 4 inches, although any other units of measurement also could be used. It will be further noted that for non-rectangular items such as round containers, cylinders, bottles, etc., the width metric may correspond to the diameter of the item. More generally, an item may be logically associated with a geometric solid such as a right hexahedron, for example, into which the item may be inscribed, so that the storage unit 56A may specify a dimension of the solid suitable for comparison with the width of the corresponding shelf. Also, as discussed in more detail below, the dimensions of certain items can be considered to be adjustable within certain limits (e.g., a soft package that includes several rolls of paper towels can be compressed, if necessary, by one or several inches).

The item data may also specify the range of the allowable number of facings of each item 20A-26C. To continue with the example above, the item 24A may have 0, 1, or 2 facings in the retail area 10; the item 24B may have 0 or 1 facing; and the item 26C may have 2 or 3 facings. Further, the storage unit 56A may store a facing capacity of each item. For example, the items 26A, 26B, and 26C may have the respective capacities of 2, 3, and 2 (see FIG. 1). Facing capacity in an alternative embodiment may not be stored in memory at all, but rather be derived from the width metric of a shelf and a corresponding width metric of an item. Still further, the storage unit 56A in some embodiments may also store the height of each of the item 20A-26C so that items in relatively tall boxes or other containers can be restricted to the shelves that have an appropriate height capacity. Generally speaking, the storage unit 56A may store a number of additional physical parameters such as the approximate shape of the item, the weight of the item, etc.

In addition to spatial parameters of the items 20A-26C, the item data storage unit 56A may store financial parameters of each item such as unit price (to the manufacturer or retailer), unit cost (to consumer), gross unit profit, net unit profit, etc. In general, any financial parameter may be used for optimization, as long as the same metric is used for every item. However, in some situations an analyst may prefer to generate a planogram in which gross profit is maximized, while in other situations the analyst may prefer to maximize net profit. In yet other situations, the analyst may wish to optimize unit sales. For example, an item may be a so-called "traffic driver" that has a tendency to draw customers to other items. Thus, a user interface of the optimization system 50 preferably includes a control to allow selection of the desired financial metric.

The shelf data storage unit 56B may store parameters for each of the shelves 12, 14, and 16. Referring back to FIG. 1, the shelf 12 has the width $L_1$ and the depth D, and each of the shelves 14 and 16 has the width $L_2$ and the same depth D. If desired, the shelf data storage unit 56B may also store other shelf parameters such as the maximum amount of weight each shelf may hold, special restrictions for a particular shelf, etc.

With continued reference to FIG. 2, the survey data storage unit 56C and the syndicated data storage 56D may store survey data and syndicated data, respectively. Together, the survey data and the syndicated data at least partially define consumer behavior and historical sales data descriptive of how customers perceive the items 20A-26C. More specifically, survey data may include statistics related to how loyal consumers are to their favorite brands (i.e., whether consumers purchase a comparable replacement or "walk" without making a purchase), while syndicated data automatically collected at cash registers, for example, describes how often customers purchase certain items together, how likely customers are to repeat the same purchase, how often the same purchase is repeated per unit of time, etc. As discussed in more detail below, the survey data and the syndicated data may be used to generate demand models for respective subsets of items 20A-26C.

The optimization system 50 may further include an item-level business rules storage unit 56E and a choice-set-level business rule storage unit 56F to store various business rules that may affect assortment optimization and layout automation. As one example, a business rule may require that boxes and other containers be placed on a shelf in an ascending order of size relative to the left edge of the shelf, so that a 20-diaper package always be placed to the left of a 50-diaper package. As another example, a business rule may require that a poisonous item and a food item reside on separate shelves. As yet another example, a business rule may make require that at least one facing of a certain item be unconditionally present in an assortment. Analysts may apply this rule when several items have been identified as displaying strong affinity in a complementary set, i.e., when the sales of one item positively affect the sales of another item. In this case, an item with a relatively small unit profit may be included in an assortment despite its low profitability to stimulate the sales of a more expensive item. Thus, in a hypothetical store, lighter fluid may be space-efficient and have high profit margin, and a facing of bags of charcoal may be included next to the facing of lighter fluid to maximize the overall profit despite the relatively low profitability of charcoal and the large size of charcoal bags.

Further examples of business rules may include a requirement that heavy bags be placed on one of the lower shelves, that toy guns not be included in an assortment in certain geographical areas, etc. Generally speaking, business rules can specify restrictions on brands, colors, sequencing, etc., and in some embodiments may include nested conditions. Some of the business rules may apply to individual items, while others may apply to choice sets (e.g., an infant formula choice set cannot be on the same shelf as any baby medicine choice set). Item-level and choice-set-level rules accordingly may be stored separately in the storage units 56E and 56F, respectively, although it is also possible to maintain a single repository for all business rules.

During operation, users such as analysts may interact with the assortment development engine 54 and the storage units 56A-F via one or several terminals or terminal stations 58A-B. To this end, the optimization system 50 may support a user interface that allows users to specify parameters and attributes of the items 20A-26C, to specify the particulars of the retail area 10, to configure business rules, etc. In some embodiments, some of the terminals 58A-B may be remote so that a single development engine 54 may support multiple analysts.

The processing unit 52, the storage units 56A-F, and the terminal stations 58A-B may be interconnected via a network backbone 60 such as Ethernet. The optimization system 50 may further include a router 62 to communicate with hosts on a network 64 which may be the Internet, for example. In some embodiments, the storage units 56A-F receive data such as historical sales data, for example, from external hosts residing in the network 64.

The processing unit 52 may further implement a layout optimizer 66 that generates an efficient planogram layout for the product assortment generated using the development engine 54. In some embodiments, the layout optimizer 66 receives shoppability and profitability targets from a corresponding user interface supported by the terminal stations 58A-B. In particular, a user such as an analyst may select various trade-off levels between shoppability, profitability, and other factors, if desired. In response to user selection, the layout optimizer 66 may perform nested grouping of items. In some embodiments, the layout optimizer 66 may implement simulated annealing techniques to improve the layout.

As illustrated in the exploded view in FIG. 2, the development engine 54 may include several interconnected components such as a choice set generator 70, a facing combination generator 72, a demand transfer matrix generator 74, a profit calculator 76, a sale data generator for limited-supply items 78, a combination remover 80, a combinatorial problem input generator 81, and a combinatorial problem solver 82. The various ones of the modules 70-82 may be implemented using hardware, software instructions executed by a processor, firmware, or combinations thereof. Of course, the components 70-82 may be grouped together or, conversely, divided into smaller components according to implementation choices.

The choice set generator 70 may operate in a fully or partially automated manner to develop choice sets within the group of items 20A-26C. For example, an analyst may operate the choice set generator 70 via one of the terminals 58A or 58B to define a choice set $N_1$ corresponding to baby powder products and including the items 20A and 20B, a choice set $N_2$ corresponding to baby wipes and including the items 22A and 22B, a choice set $N_3$ corresponding to diapers and including the items 24A, 24B, and 24C, and a choice set $N_4$ corresponding to infant formula and including the items 26A, 26B, and 26C. As discussed above, the items in each of the sets $N_1$-$N_4$ can in principle replace each other, while items in different ones of the sets $N_1$-$N_4$ cannot replace each other. For example, baby wipes cannot replace baby formula or, as a less obvious example, diapers for two-year-old children cannot replace diapers for newborns.

In some embodiments, the choice set generator 70 may interact with a choice set splitter 71 to divide choice sets that exceed one or more limits into several smaller choice sets. For example, the assortment development engine 54 may impose a 10-item limit on each choice set, and the choice set splitter 71 may accordingly divide each choice set that includes more than 10 items based on function, size, brand, price, or any other criterion.

Next, a facing combination generator 72 may generate various allowable combinations of items in each choice set in response to the input from the choice set generator 70 and in view of item, shelf, and other parameters stored in the storage units 56A-F. To consider one example of an input to the facing combination generator 72, the choice set $N_3$ considered above may be associated with the following parameters:

TABLE 1

| Item | Facings | Shelf Capacity | Unit Profit | Unit Width |
|------|---------|----------------|-------------|------------|
| 24A  | 0, 1, 2 | 8              | 9           | 5          |
| 24B  | 0, 1    | 7              | 5           | 3          |
| 24C  | 2, 3    | 5              | 8           | 4          |

Thus, the item 24A may have 0, 1, or 2 facing, and each facing of the item 24A can include up to 3 units. The sale of each unit is associated with a profit metric of 9 (e.g., nine dollars). Each unit of the item 24A has a width metric of 5. The input corresponding to the sets $N_1$, $N_2$, and $N_4$ may be similarly defined.

Figure 3:
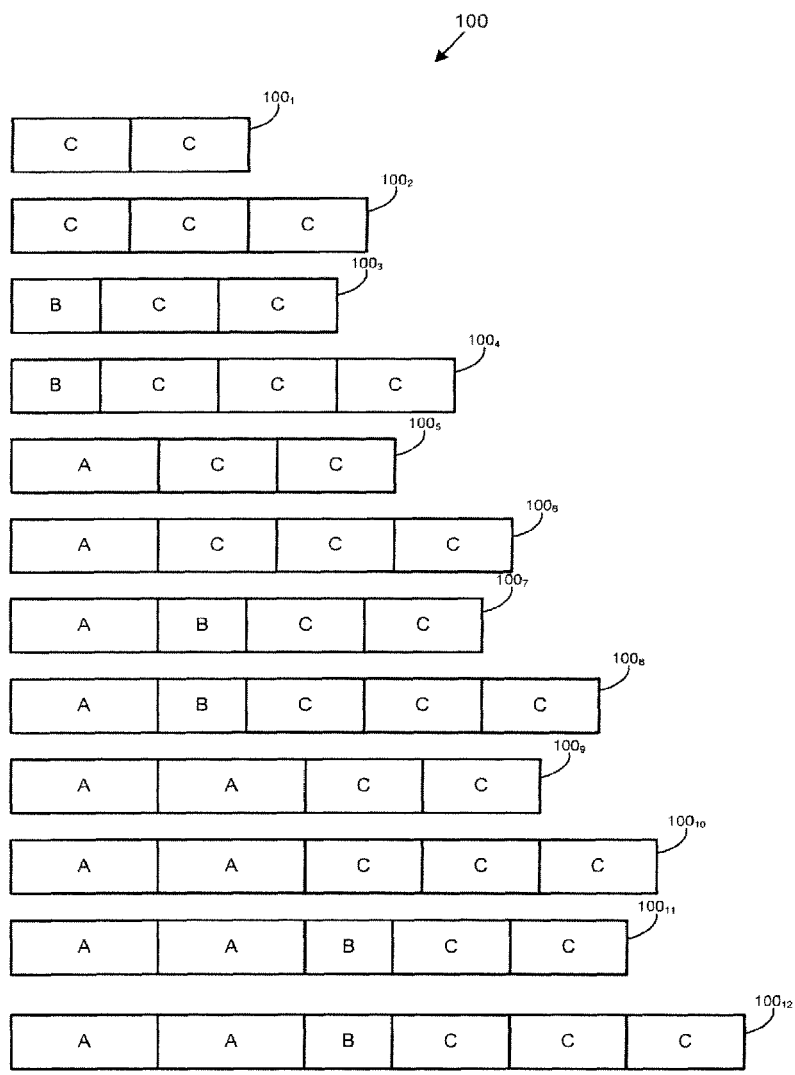
FIG. 3 is a block diagram that illustrates an example group of facing combinations generated for a certain choice set.

Using input data such as the data summarized in Table 1, the facing combination generator 72 may enumerate facing combinations for each of the choice sets $N_1$-$N_4$. In an embodiment, the facing combination generator 72 may implement a recursive technique generally known in the art. FIG. 3 is a block diagram that illustrates a group 100 of facing combinations $100_1$, $100_2$, ... $100_{12}$ which the facing combination generator 72 may develop for the choice set $N_3$. For ease of illustration, the blocks in each facing combination $100_1$, $100_2$, ... $100_{12}$ are labeled "A" for the item 24A, "B" for the item 24B, and "C" for the item 24C. It will be noted that the length of each block in FIG. 3 corresponds to the unit width metric listed in Table 1.

As illustrated in FIG. 3, the facing combination generator 72 generates 3*2*2=12 facing combinations, and the resulting width of each combination may be easily calculated as a sum of the individual width metrics. In some embodiments, the combination generator 72 may also include or cooperate with a downscaling module (not shown) to reduce the number of facing combinations and thus simplify subsequent analysis. The operation of an example downscaling module is discussed below with reference to FIGS. 6A and 6B. Table 2 included below lists the parameters of each facing combination and the corresponding width values.

TABLE 2

|    | Facings$_{24A}$ | Facings$_{24B}$ | Facings$_{24C}$ | Width |
|----|-----------------|-----------------|-----------------|-------|
| 1  | 0               | 0               | 2               | 8     |
| 2  | 0               | 0               | 3               | 12    |
| 3  | 0               | 1               | 2               | 11    |
| 4  | 0               | 1               | 3               | 15    |
| 5  | 1               | 0               | 2               | 13    |
| 6  | 1               | 0               | 3               | 17    |
| 7  | 1               | 1               | 2               | 16    |
| 8  | 1               | 1               | 3               | 20    |
| 9  | 2               | 0               | 2               | 18    |
| 10 | 2               | 0               | 3               | 22    |
| 11 | 2               | 1               | 2               | 21    |
| 12 | 2               | 1               | 3               | 25    |

The facing combination generator 72 can easily calculate the width of each facing combination by summing the individual unit widths, multiplied by the respective number of facings, for each of the units 24A-C.

Referring back to FIG. 2, the profit calculator 76 may calculate an expected profit, or other type of benefit, for each of the facing combinations $100_1$, $100_2$, ... $100_{12}$. However, unlike width, profit associated with the facing combinations $100_1$, $100_2$, ... $100_{12}$ is difficult to calculate due to item interaction within the choice set $N_3$. In particular, items in a common choice set, such as the items 24A-C in the choice set $N_3$, may have a detrimental effect on the sales of other items in the same choice set. This effect is referred to herein as cannibalization, and the demand transfer matrix generator 74 may help the profit calculator 76 to properly account for this and other item interaction effects. Moreover, the sale data generator 78 may further improve the accuracy of profit estimation in those typical situations when the supply of items 24A-C is limited.

Figure 4:
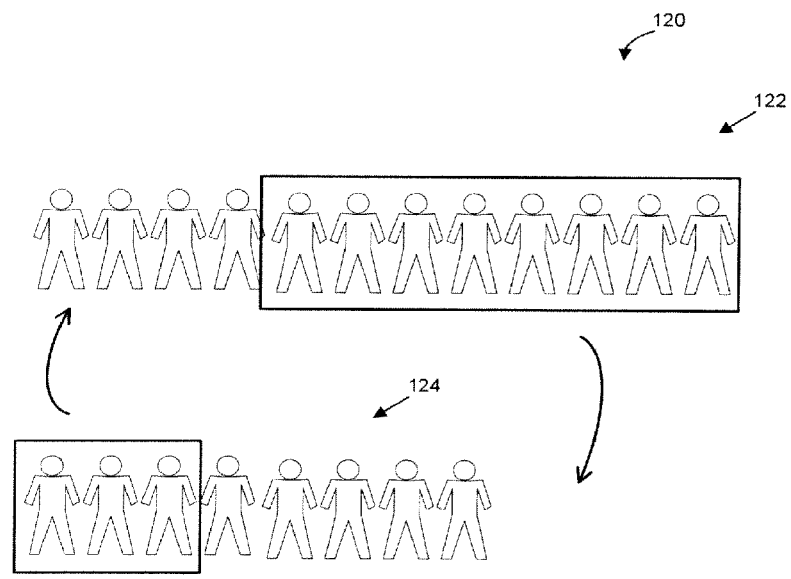
FIG. 4 is schematic illustration of interaction between two items associated with a certain degree of substitutability.

To better explain the operation of the modules 76 and 78, FIG. 4 first illustrates, in a schematic format, a situation in which customers choose between two items a and b which are mutually substitutable, and in which each customer purchases one item at a time. Although many choice sets such as the choice set $N_3$ include more than two substitutable items, FIG. 4 illustrates a simpler case of two-item interaction by way of example. In particular, a diagram 120 depicts a set 122 that consists of twelve customers who prefer item a, and a set 124 that consists of eight costumers who prefer item b. Out of the twelve costumers in the set 122, eight would accept item b as a substitute when item a is not available, and three customers in the set 124 would accept item a as a substitute when item b is not available.

The relationship illustrated in the diagram 120 may be expressed in a matrix form by associating each row with a preferred item and associating each column with an acceptable substitute. The resulting matrix may be referred to as a demand transfer matrix (DTM). FIG. 4 illustrates a DTM 130 that corresponds to the diagram 120, as well as a corresponding loss vector 132 that indicates the number of customers lost at each substitution. Thus, as expected, the element in the first row and in the first column of the DTM 130 indicates that of the 12 customers who prefer item a accept item a; the element in the first row and in the second column of the DTM 130 indicates that 8 of those who prefer item a will accept item b if item a is not available; and the upper-row element in the loss vector 132 indicates that 4 customers do not make a purchase (i.e., are "lost" to the retailer) if item a is not available. Similarly, 5 customers are lost when item b is not present, as reflected in the bottom row of the loss vector 132.

Using the DTM 130, and assuming unlimited supply of items a and b, a technique referred to herein as substitution arithmetic can be applied to generate further sales and loss metrics:

Sales of item $a$ when item $b$ is not present=12+3=15

Sales of item $b$ when item $a$ is not present=8+8=16

Sales of items $a$ and $b$ when both items $a$ and $b$ are present=12+8=20

Referring back to FIG. 3, the demand transfer matrix generator 74 may generate matrices similar to the DTM 130 based on the survey data and the syndicated data stored in the storage units 56C-D. In a typical scenario, however, supply of items a and b is limited. To account for limited item supply, the sales data generator 78 may develop sales data by calculating projected sales of items for various numbers of other items in the same choice set. In the simple two-item example introduced above, the sales data generator 78 may calculate the sales of items a and b for each combination $N_a$ and $N_b$, where $N_a$ is the number of units of item a, and $N_b$ is the number of units of item b. Because each customer in the sets 122 and 124 purchases at most one item, $0 \leq N_a \leq 20$ and $0 \leq N_b \leq 20$.

Next, FIG. 5A illustrates an example matrix $M_a$ that specifies the projected sales of item a for various values of $N_a$ and $N_b$, and FIG. 5B illustrates an example matrix $M_b$ that specifies the projected sales of item b for various values of $N_a$ and $N_b$. Referring first to FIG. 5A, the sales of item a in the absence of item b increase from 0 to 15 until the supply of item a reaches 15, and stay at 15 even as the supply of item a continues to increase to 20 units. As indicated above, this upper limit of 15 can be derived from the DTM 130 (i.e., 12+3=15). When the supply of item b is 1, 2, 3, 4, or 5, the sales of a are the same because out of the 8 customers who prefer b, only 3 will find a acceptable when the supply of b is not sufficient. It will be noted that in a region $R_B$ of the matrix $M_a$, the effect of substitution of item a for item b (or vice versa) is beneficial to the sales of a. However, in a region $R_D$ of the matrix $M_a$, the effect of substitution is detrimental to the sales of a. In particular, when the supply of b is between 6 and 8, customers who could purchase a select b and thus prevent the sales of a from being maximized. Finally, the sales of a in the "stable" regions $R_S$ are not further affected by increases in the supply of a or b.

It is noted that the sales of a decrease in the region $R_D$ due to cannibalization. In other words, the relatively high supply of item b effectively decreases the sales potential of item a. However, although the detrimental effect on sales in the region $R_D$ is due to cannibalization, cannibalization need not always be detrimental to the overall sales of items a and b (as discussed in more detail with reference to FIG. 5C), or to the overall profit. In particular, the profit associated with the sale of one unit of item b may be significantly higher than the profit associated with the sale of one unit of item a, and cannibalization of item a by item b in some instances may actually increase the overall profit.

Similarly in the matrix $M_b$ illustrated in FIG. 5B, the sales of item b in the region $R_D$ are cannibalized by the relatively high supply of item a, while the numbers of supplied units of items a and b in the region $R_B$ are beneficial to the sales of item b. As expected from the previous discussion of the DTM 130, the matrix $M_b$ indicates that the sales of item b can be at most 16.

Now referring to FIG. 5C, a matrix $M_t$ represents a totality of sales of items a and b for various values of $N_a$ and $N_b$. Thus, every element of the matrix 154 is a sum of the corresponding elements of the matrices $M_a$ and $M_b$, i.e., $$M_{ti,j}=M_{ai,j}+M_{bi,j}. \quad \text{(Equation 1)}$$

Although FIG. 5C illustrates the regions $R_{D1}$ and $R_{D2}$ corresponding to the $R_D$ region of the matrix $M_a$ and the $R_D$ region of the matrix $M_b$, respectively, it will be noted that the effect of cannibalization on sales in the overall set {a,b} is not necessarily detrimental, i.e., the overall sales each of the regions $R_{D1}$ and $R_{D2}$ is at the maximum level of 20. However, because the unit profit $P_a$ associated item a and the unit profit $P_b$ associated with item b may not be the same, some of the identical elements in the matrix $M_t$ may correspond to a different profit metric. For example, each of the elements $M_{t\ 8,12}$ and $M_{t\ 12,8}$ of the matrix $M_t$ specifies that a total of 20 units is sold, but the profit associated with $M_{t\ 8,12}$ is equal to $12*P_a+8*P_b$, whereas the profit associated with $M_{t\ 12,8}$ corresponds to $8*P_a+12*P_b$. In general, the profit $P_{i,j}$ associated with each combination of i units a and j units of b can be expressed as:

$$P_{i,j}=M_{ai,j}*P_a+M_{bi,j}*P_b. \quad \text{(Equation 2)}$$

Meanwhile, the width of each combination of i units a and j units of b can be expressed as:

$$P_{i,j}=i*W_a+j*W_b, \quad \text{(Equation 3)}$$

where $W_a$ is the width of a single unit of item a, and $W_b$ is the width of a single unit of item b.

In the particular case of items a and b associated with a demand transfer scheme illustrated in FIG. 4, the profit calculator 76 may receive data similar to the data reflected in the matrices $M_a$, $M_b$ and $M_t$, and calculate the expected profit associated with each combination of items a and b using the equation (2) or a similar technique. Theoretically, this approach may be generalized to accommodate any number N of items $i_1, i_2, \ldots i_N$ competing within a certain choice set, in which case the sales data generator 78 may generate N projected sales matrices, each having N dimensions, so that each element of a matrix $M_{i_r}$ specifies the number of items $i_r$ sold for a certain combination of units of every other item in the choice set $i_1, i_2, \ldots i_N$. The corresponding profit of a combination $P_{x_1, x_2, \ldots, x_n}$ of $x_1$ items $i_1$, $x_2$ items $x_2, \ldots$, and $x_N$ items $i_N$ can then be expressed as $$P_{x_1,x_2,\ldots,x_n} = \sum_{j}^{N} M_{ij\,x_1,x_2,\ldots,x_n} \quad \text{(Equation 4)}$$

However, populating tables $M_{i_r}$ in a deterministic manner may not be possible. In particular, certain customers may accept several different items as substitutes if the preferred item is not available, and the selection between the acceptable substitutes may be driven by price, brand recognition, or even be or appear to be random. In another aspect, the order of arrival of customers may further affect the selection of preferred items and acceptable substitutes. Accordingly, substitution arithmetic associated with equations (1)-(4) may be optimized and simplified to efficiently process multiple choice sets with relatively large numbers of items in each, as discussed in detail below.

Generally with respect to the example matrices of FIGS. 5A-C, it is also noted that many of the item combinations may represent impractical choices (e.g., an excessively high number of facings of one item at the expense of other items), invalid choices (i.e., choices that violate one or several business rules), or clearly irrational choices. Thus, it will be appreciated that generating complete matrices $M_a$, $M_b$ and $M_t$ is discussed for the purposes of clarity only, and that the profit calculator 76 and the sales data generator 78 need not evaluate all possible combinations of items in a choice set.

To continue with the example sets 122 and 124, items a and b may be associated with the following parameters and business rules:

TABLE 3

| Item | Facing Width | Facing Capacity | Mandatory? | Min Facings | Max Facings | Unit Cost | Unit Price | Unit Gross Profit | Unit Net Profit |
|---|---|---|---|---|---|---|---|---|---|
| A | 2 | 10 | No | 1 | 2 | 2 | 3 | 1 | 0.7 |
| B | 4 | 5 | Yes | 1 | 3 | 3 | 4 | 1 | 0.75 |

Figure 5D:
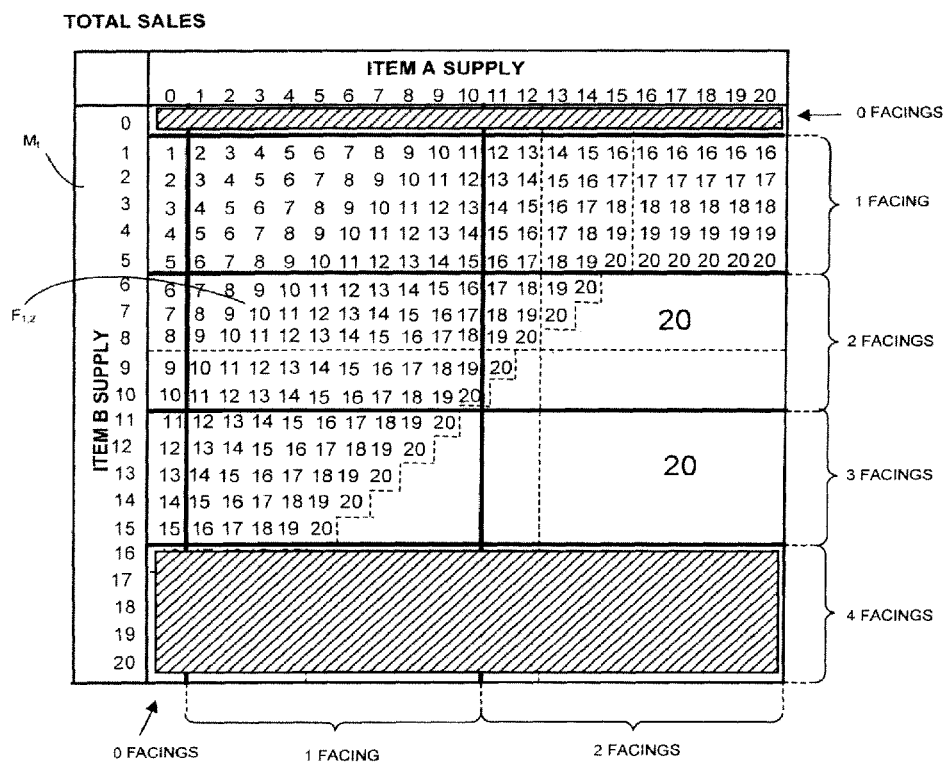
FIG. 5D is the matrix of 5C divided into several regions in accordance with respective facing capacities of the first and the second items.

Using the data listed in Table 3, the matrix $M_t$ may be partitioned into regions based on the numbers of facings as illustrated in FIG. 5D. Several portions of the matrix $M_t$ can be immediately eliminated, as illustrated by respective shaded regions, because the elements in these portions represent choices that violate the mandatory, minimum facing, or maximum facing rules. Next, the data listed below in Table 4 may be generated:

TABLE 4

| Facings A | B | Total Width | Units of A Sold | Units of B Sold | Rev. from A | Rev. from B | Gross Profit from A | Gross profit from B | Net Profit from A | Net Profit from B | Units Total | Rev. Total | Gross Profit Total | Net Profit Total |
|---|---|---|---|---|---|---|---|---|---|---|---|---|---|---|
| 0 | 0 | 0  | 0  | 0  | 0  | 0  | 0  | 0 | 0    | 0    | 0  | 0  | 0  | 0 |
| 1 | 0 | 2  | 10 | 0  | 30 | 0  | 10 | 0 | 7    | 0    | 10 | 3  | 10 | 7 |
| 0 | 1 | 4  | 0  | 4  | 0  | 16 | 0  | 4 | 0    | 3    | 4  | 16 | 4  | 3 |
| 2 | 0 | 4  | 15 | 0  | 45 | 9  | 15 | 0 | 10.5 | 0    | 15 | 45 | 14 | 10.5 |
| 1 | 1 | 6  | 10 | 5  | 30 | 20 | 10 | 5 | 7    | 3.75 | 15 | 50 | 15 | 10.75 |
| 0 | 2 | 8  | 0  | 9  | 0  | 36 | 0  | 9 | 0    | 6.75 | 9  | 36 | 9  | 6.75 |
| 2 | 1 | 8  | 15 | 5  | 45 | 20 | 15 | 5 | 10.5 | 3.75 | 20 | 65 | 20 | 14.25 |
| 1 | 2 | 10 | 10 | 10 | 30 | 40 | 10 | 10| 7    | 7.5  | 20 | 70 | 20 | 14.5 |
| 0 | 3 | 12 | 0  | 14 | 0  | 56 | 0  | 14| 0    | 10.5 | 14 | 56 | 14 | 10.5 |
| 2 | 2 | 12 | 12 | 8  | 36 | 32 | 12 | 8 | 8.4  | 6    | 20 | 68 | 20 | 14.5 |
| 1 | 3 | 14 | 10 | 10 | 30 | 40 | 10 | 10| 7    | 7.5  | 20 | 70 | 20 | 14.5 |
| 2 | 3 | 16 | 12 | 8  | 36 | 32 | 12 | 8 | 8.4  | 6    | 20 | 68 | 20 | 14.5 |

Table 4 lists only those numbers of facings of items a and b that do not violate the rules specified in Table 3. Further, to populate the Total Width column, the number of facings of each item are multiplied by the respective item width metric. The columns Units of A Sold and Units of B Sold may be populated by selecting the maximum possible numbers of units based on the respective regions of the matrices $M_a$, $M_b$ and $M_t$. For example, to populate the fields in these two columns in the row associated with one facing of item a and two facings of item b, the profit calculator 76 (or an analyst operating one of the terminals 58A-B) may consider a region $F_{1,2}$ of the matrix $M_t$ illustrated in FIG. 5D, as well as the respective regions in the matrices $M_a$ and $M_b$. It will be noted that the maximum number of sales in this region corresponds to the element in the lower right corner of the region $F_{1,2}$ specifying the sale of 10 units of a and 10 units of b.

The columns Revenue from A, Revenue from B, Gross Profit from A, Gross Profit from B, Net Profit from A, and Net Profit from A may be populated by multiplying the numbers in the columns Units of A Sold and Units of B Sold by the corresponding profit metrics specified in Table 3. Finally, the columns Units Total, Revenue Total, Gross Profit Total, and Net Profit Total may be populated by summing up the benefit metrics for all items. Thus, Table 4 specifies profit metrics for various facing combinations of the example choice set illustrated in FIG. 4. Of course, similar metrics may be developed for each choice set within a group of items that are candidates for an assortment selection. The assortment development engine 54 may then utilize the profit metrics generated for each choice set in developing an overall solution, i.e., a selection of several choice sets in an assortment for a specified retail space.

Referring back to FIG. 2, the combinatorial problem solver 82 may automatically optimize a selection of choice sets using the profit metrics developed by the profit calculator 76. In some embodiments, the assortment development engine 54 may also include a combination remover 80 to eliminate several non-optimal facing combinations and therefore reduce the complexity of the problem which the combinatorial problem solver 82 must solve. In particular, when two allowable facing combinations of items use the same amount of shelf space but are associated with non-equal benefit metrics, the combination with the higher metric can be said to dominate the combination of the lower metric, and the dominated combination can be safely removed. Referring to Table 4, the combination of 0 facings of item a and 2 facings of item b is associated with width 8 and net profit of 6.25, whereas the combination of 2 facing of item a and 1 facing of item b is associated with the same width 8 but a higher net profit of 14.25. The latter combination is thus dominant, and the combination of 0 facings of item a and 2 facings of item b need not be considered in subsequent analysis. The combination remover 80 may further analyze other combinations in the choice set listed in Table 4 and also remove the combination of 0 facings of item a and 1 facing of item b, as well as the combination of 0 facings of item a and 3 facings of item b.

In an embodiment, or according to a configuration parameter of the assortment development engine 54, the combination remover 80 may also implement a strong dominance rule whereby a facing combination with a smaller width and larger profit is considered dominant relative to a facing combination with a larger width and lower profit. However, it will be noted that the rule of strong dominance may sometimes result in solutions that do not fill up the entire width of a shelf, i.e., solutions that are aesthetically less pleasing. Accordingly, the strong dominance rule may be enabled or disabled according to user configuration.

In some embodiments, the combination remover 80 is adapted to also remove same-valued combinations, i.e., combinations associated with the same width and the same benefit metric. The combination remover 80 may choose from among several same-valued combinations randomly or based on any suitable tie-breaker such as, for example, a closer proximity between numbers of facings to achieve a better aesthetic effect. For example, the combination {2, 2, 3} in a certain choice set may be preferable to a same-valued combination {5, 1, 1}.

In yet other embodiments, the combination remover 80 may apply item-level rules to the combinations output by the profit calculator 76. More specifically, the components 72-78 may generate all potential facing combinations and the respective profit metrics without regard to item-level rules, and all elimination of invalid combinations may then be relegated to the combination remover 80. Further, the combination remover 80 may apply choice-set-specific rules to eliminate invalid combinations of choice sets.

Upon generating several choice sets, various facing combinations for each set along with the respective metrics, and optionally reducing each set by eliminating invalid, non-optimal, and superfluous combinations, the assortment development engine 54 may retrieve retail space data from the shelf-data database 56B and provide the retrieved data along with the generated choice sets as input to the combinatorial problem solver 82 via the combinatorial problem input generator 81. In an embodiment, the combinatorial problem input generator 81 describes the choice set data and the retail space data using a format of a general combinatorial optimization problem such as a knapsack problem, for example. Moreover, because the combinatorial problem solver 82 may include several stages such as a first stage that involves selecting one facing combination from each choice set to fit within an overall space constraint, and a second stage that involves breaking up the solution into multiple shelves, the combinatorial problem input generator 81 may format the input to include additional information to support each of the stages. An example format of an input to the combinatorial problem solver 82 is discussed in more detail below.

Next, FIGS. 6A-8 illustrate some of the example embodiments of the components 70-82, as well as several components which may be utilized in the optimization system 50 additionally or alternatively to the components 70-82. Several flowcharts of the related methods are also provided.

Figure 6A:
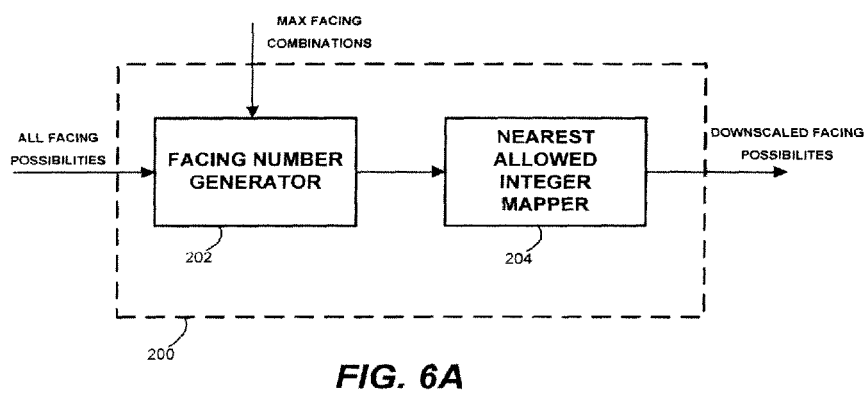
FIG. 6A is a block diagram of an example downscaling module which may be used in the system illustrated in FIG. 2.
Figure 6B:
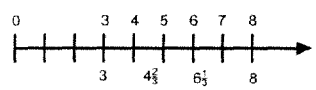
FIG. 6B schematically illustrates an example range of facings downscaled by the module illustrated in FIG. 6A.

Referring to FIG. 6A, the assortment development engine 54 in some embodiments may include a downscaling module 200 to reduce the number of combinations to be generated by the combination generator 72. The downscaling module 200 may include a facing number generator 202 and a nearest allowed integer mapper 204. In response to the input that specifies the complete range of all allowed facing combinations (e.g., between 1 and 10 facings of item 1, between 5 and 11 facings of item 2, etc.), the downscaling module 200 may first linearly spread the facing possibilities across the allowable range. For example, a business rule may specify that a certain non-mandatory item may have a minimum of 3 facings and a maximum of 8 facings. Thus, the item may have 0, 3, 4, 5, 6, 7, or 8 facings. The degree of downscaling may be controlled via a maximum facing combinations input, which for example may require that at most 5 facing values actually be used in an assortment. In some embodiments, the downscaling module 200 eliminates 0 from a candidate list for reduction (because another business rule requires that the item remain optional), and evenly spreads the remaining four desired facing values across the interval [3, 8], as illustrated in FIG. 6B. The module 202 may then identify the most proximate allowed integers. In this case, the downscaling module 200 may output 0, 3, 5, 6, and 8 as the reduced set of facings values.

Figure 7:
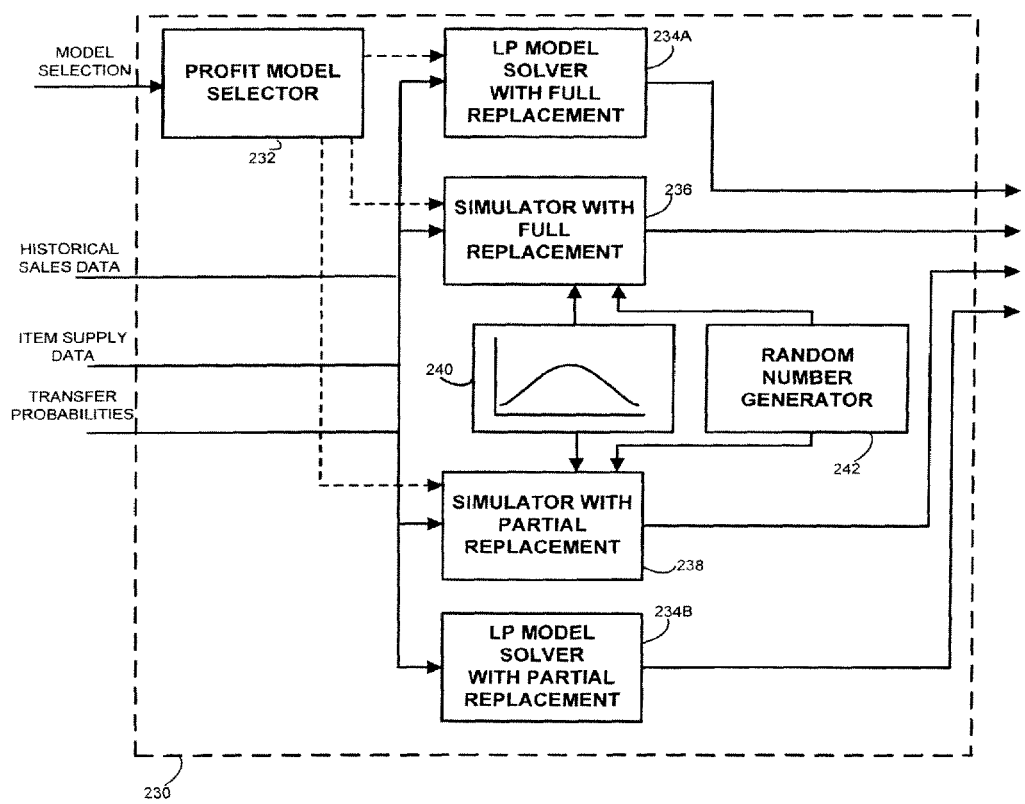
FIG. 7 is a block diagram of an example profit model generator which may be used in the system illustrated in FIG. 2.

As a faster alternative to calculating the profit for various combinations of items in a choice set using the equation (4) and the associated techniques, the profit calculator 76 may include a combinatorial problem solver 230 illustrated in FIG. 7 to construct a reliable profit model using a suitable linear programming (LP) technique for each choice. As another alternative, the profit calculator 76 may apply one of several simulation models, and select a number of repeated simulation runs in accordance with a target level of reliability. The selection between LP and one of the simulation modes may be automatic (e.g., based on the size of a choice set) or user-selectable. In each case, the profit calculator 76 may utilize historical sales data stored in the storage units 56C-D, demand transfer data supplied by analysts via the terminals 58A-B or stored in one of the storage units 56A-F, and transfer probability data developed by the optimization system 50 in cooperation with users such as analysts.

Referring to FIG. 7, the combinatorial problem solver 230 may include a profit model selector 232 which may be responsive to a user command entered via one of the terminal stations 58A-B, for example. The profit model selector 232 may activate one of an LP model solver with full replacement 234A, an LP model solver with partial replacement 234B, a simulator with full replacement 236, or a simulator with partial replacement 236. Each of the modules 234A-238 may generate a profit model using a respective programming or simulation technique based on historical sales data input and item supply data. If desired, the combinatorial problem solver 230 may implement additional techniques selectable via the profit model selector 232 or, conversely, include one of the modules 234A-238 and omit the profit model selector 232. Further, the combinatorial problem solver 230 may include a distribution module 240 to supply distribution (such as normal distribution) parameters to one or both of the simulator modules 236 and 238. A random generator module 242 may generate random numbers to simulate consumer choices, arrival of customers to a store, etc.

In general, the profit calculator 76 and, in particular, the combinatorial problem solver 230 can operate with any desired profit model to assess the profitability of a certain configuration. The profit calculator 76 can receive, as an input, a specified number of facings for each item in a set of items and output profitability of the specified combination. In at least some of the embodiments, the profit calculator 76 utilizes an LP model to calculate profitability.

Figure 8:
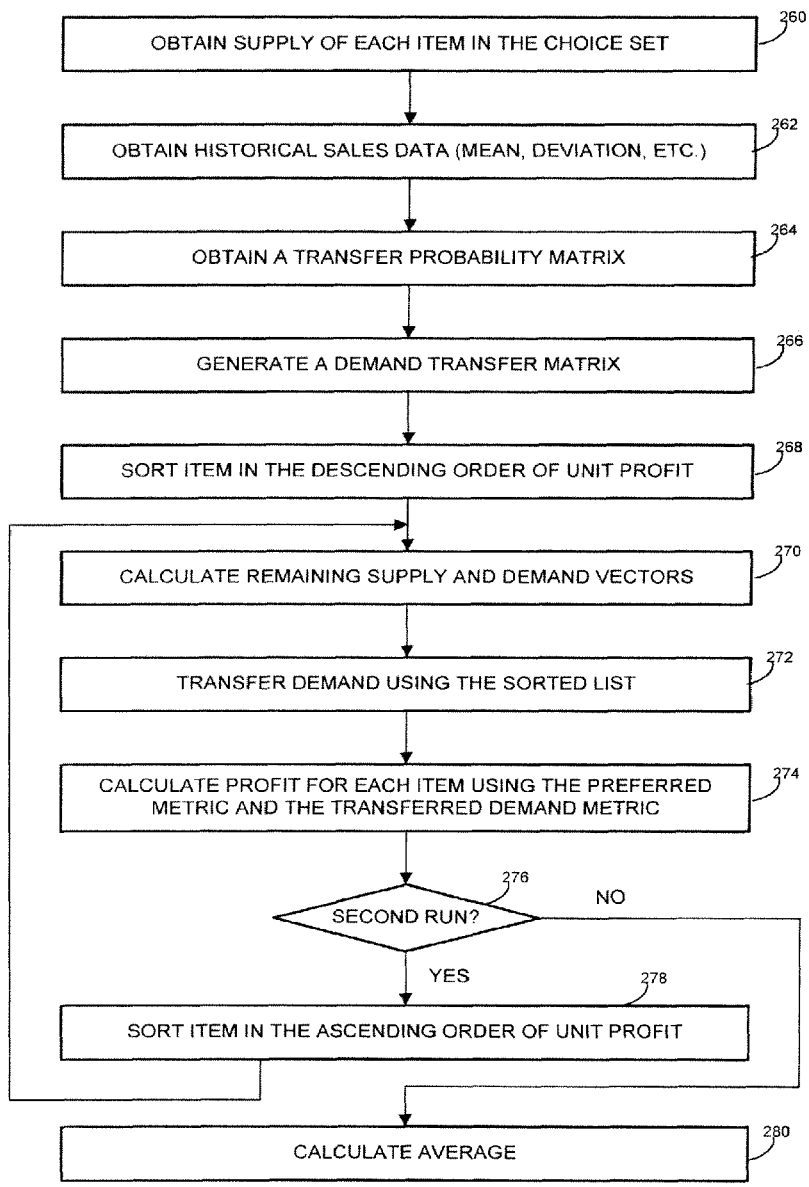
FIG. 8 is a flow diagram of an example method which the combinatorial problem solver illustrated in FIG. 7 may implement to generate a profitability model using a linear programming technique.

An example method for generating a profit model which the LP model solver 234A or 234B may implement is discussed next with reference to FIG. 8. In an embodiment, the LP model solvers 234A and 234B are generally similar, except that the LP model solver with full replacement 234A implements the assumption that a customer will always purchase a replacement item if the preferred item is not available, whereas the LP model solver with partial replacement 234B does not implement this assumption. Generally speaking, the LP model solver 234A or 234B may implement a greedy approach characterized by systematically making locally optimal choices. In this example, the LP model solver 234B further implements the following assumptions: (1) a customer will always prefer to satisfy his or her main preference prior to considering an alternative; (2) a customer will buy a replacement item subject to demand transfer probability; and (3) items in excess of the available supply cannot be sold. On the other hand, rather than implementing assumption (2), the LP model solver 234A may implement a more optimistic assumption (2a) that a customer will always purchase a replacement item if one is available. Generally speaking, an LP model consistent with the assumption (2a) generates an optimistic solution, whereas the assumption (2) adjusts the optimistic solution by considering transfer probabilities. For the purposes of clarity, the flow diagram in FIG. 8 is illustrated as including several optional blocks at which the LP model solver 234B obtains transfer probability data, generates a DTM, and applies the DTM to adjust the expected profits in accordance with the assumption (2).

At blocks 260-266, the LP model solver 234A or 234B develops a demand transfer matrix that may be generally similar to the DTM 130. It is noted that in an embodiment, the techniques discussed with reference to blocks 262-264 are also implemented by one or both simulators 236 and 238. In another embodiment, these techniques are implemented in a separate module communicatively coupled to the LP model solver 234A or 234B as well as the simulators 236 and 238. It is further noted that if the demand transfer matrix is available (e.g., provided via a user interface), the LP model solver 234A or 234B proceeds directly to block 268. Otherwise, at block 260, the LP model solver 234A or 234B obtains supply metrics of each item in a certain choice set for a certain facing combination. Referring back to FIG. 1 and Tables 1 and 2, the combination associated with one facing of the item 24A, one facing of the item 24B, and two facings of the item 24C corresponds to a set of capacity metrics {3, 3, 4} which can be obtained by multiplying the number of facings of each item by the corresponding facing capacity. Next, at block 262, the LP model solver 234A or 234B may obtain historical sales data for each item. The optimization system 50 may store or derive average, standard deviation, and other metrics related to sales statistics for each item.

Referring again to FIG. 8, the LP model solver 234A or 234B at block 264 may obtain a transfer probability matrix TPM which may be manually formatted or automatically derived based on survey data, user data, or other sources. For example, a transfer probability matrix may specify the following parameters for the items 24A-C:

TABLE 5

| Item | 24A | 24B | 24C |
|------|-----|-----|-----|
| 24A  | —   | 30  | 0   |
| 24B  | 20  | —   | 40  |
| 24C  | 0   | 60  | —   |

Thus, when the item 24A is not available, a customer will choose the item 24B with a 30% probability, but will never choose the item 24C. Similarly, when the item 24B is not available, a customer will choose the item 24A with a 20% probability or the item 24C with a 40% probability, etc.

At block 266, the LP model solver 234A or 234B may generate a demand transfer matrix, $DTM_{LP}$, which may be generally similar to the DTM 130 discussed above with reference to FIG. 4. To this end, the LP model solver 234A or 234B may use the data associated with Table 5. The LP model solver 234A or 234B may apply a suitable conversion formula such as $$DTM_{LP\ i,j} = \frac{TPM_{i,j} * Avg_i}{100} \quad \text{(Equation 5)}$$

to populate at least the non-diagonal elements of the matrix $DTM_{LP}$, i.e., when i≠j. For example, the element of $DTM_{LP}$ specifying how many customers who prefer the item 24A will buy the item 24B in the absence of the item 24A may be calculated by multiplying the element in the second column of the row of Table 5 by the average sales μ of the item 24A and converting the result from percentage to units: 30*10/100=3. The diagonal elements of $DTM_{LP}$ may be set to the respective value of μ. Generating the remaining elements in this manner using an example set of data, $DTM_{LP}$ becomes:

$$DTM_{LP} = \begin{bmatrix} 10 & 2 & 0 \\ 0.6 & 3 & 1.2 \\ 0 & 7.2 & 12 \end{bmatrix}$$

Next, the LP model solver 234A or 234B may sort the items in the choice set according to the unit profit in a first order which may be descending, for example (block 268). At block 270, the LP model solver 234A or 234B may calculate remaining supply and demand vectors for the specified facing combination. In particular, an element of the remaining supply vector RSV may be generated according to $$RSV_i = MAX(Supply_i - Preferred_i, 0), \quad \text{(Equation 6)}$$

where $Supply_i$ and $Preferred_i$ correspond to the number of items supplied and preferred, respectively. In other words, the LP model solver 234A or 234B first allocates units to customers according to their primary preference (see assumption (1) above). Each $Preferred_i$ value may, in turn, be associated with the smaller one of the supply of the item and the average number of sales for the item. Thus, if the average number of customers who prefer the item exceeds the current supply, some of the demand will not be satisfied (see assumption (3)). Next, an element of the remaining demand vector RDV may be generated according to $$RDV_i = MAX(\mu_i - Preferred_i, 0). \quad \text{(Equation 7)}$$

At block 272, the LP model solver 234B may transfer demand between items in the choice set for the specified facing combination using the vectors RSV and RDV. More specifically, the LP model solver 234A or 234B iteratively steps through the list of items in the choice set sorted in the descending order of unit profit, checks if excess supply remains once customers who prefer the item have made the purchase, "pulls" the demand from another item in accordance with RSV, RDV, and the $DTM_{LP}$. However, the LP model solver 234A does not apply the $DTM_{LP}$ and instead unconditionally applies the excess demand to items with excess supply, i.e., implements the assumption (2a) instead of (2). In either case, the resulting expected profit from the sale of the item may be expressed as $$Profit_i = UnitProfit_i * (Preferred_i + MaxTransferred_i) \quad \text{(Equation 8)}$$

The LP model solver 234A or 234B may apply the equation (8) at block 274.

Sorted in the descending order of unit profit, the choice set of the items 24A-C may form an ordered list (24A, 24C, and 24B). In the first run of the method of FIG. 8, excess demand, when available, is first transferred to 24A, followed by 24C and finally by 24B.

To better illustrate the operations associated with blocks 270-274, a specific example of generating a profit model for an example facing combination {2, 0, 2}, i.e., 2 facings of the item 24A, 0 facings of the item 24B, and 2 facings of the item 24C, is discussed with reference to Table 6 below.

TABLE 6

| row | | 24A | 24B | 24C |
|-----|---|-----|-----|-----|
| 1 | Unit Profit | 9 | 5 | 8 |
| 2 | Supply | 16 | 0 | 10 |
| 3 | Average (μ) | 10 | 3 | 12 |
| 4 | Preferred = MIN (row 2, row 3) | 10 | 0 | 10 |
| 5 | Remaining Supply = MAX (row 2 − row 3, 0) | 6 | 0 | 0 |
| 6 | Remaining Demand = MAX (row 3 − row 4, 0) | 0 | 3 | 2 |
| 7 | Transfer$_{24B \to 24A}$ = MIN (MIN ((6, 3), DTM$_{2,1}$) | 0.6 | — | — |
| 8 | Remaining Supply' = row 4 − row 7 Remaining Demand' = row 6 − row 7 | 5.4 | 2.4 | 2 |
| 9 | Transfer$_{24C \to 24A}$ = MIN (MIN ((5.4, 2), DTM$_{3,1}$) | — | — | 0 |
| 10 | Total Sold | 10.6 | 0 | 10 |

In this example, row 1 corresponds to the example data in Table 1 and row 2 is populated by multiplying the number of facings of each of the items 24A-C by the respective shelf capacity provided in Table 1. It will be noted that rows 5 and 6 in Table 6 indicate that the facing {2, 0, 2} generates excess supply of the item 24A and excess demand of items 24B and 24C. After customers who prefer the item 24A purchase the preferred units within the respective supply limits, several units of the item 24A will remain, and customers who prefer the items 24B or 24C but cannot purchase these items may instead purchase the remaining units of the item 24A to the extent of the excess demand for the items 24B and 24C, and in accordance with transfer probabilities. Because the transfer probability from 24C to 24A is zero, and because the transfer from 24B to 24A statistically yields only 0.6 customers, the total number of units of 24A expected to be sold is 10.6, and the number of units of the items 24B and 24C remains at 0 and 10, respectively (in this case, limited by the short supply of these items).

As indicated above, the LP model solver 234A or 234B sorts the items in one of several possible orders. It will be noted that the order in which the items have been sorted in turn affects the result generated at blocks 270-274 because depending on whether excess demand for a particular item transfers to a more expensive or a less expensive options, the overall profit grows at a different rate. Thus, at block 276, the LP model solver 234A or 234B may check whether the computation in blocks 270-274 has been repeated for another ordering of the items. If the computation has occurred only once, the LP model solver 234A or 234B may sort the items in the opposite (in this case, ascending) order at block 278 and repeat the execution of blocks 270-274. At block 280, the LP model solver 234A or 234B may calculate the average of the two iterations and associated the profitability metric with the calculated average. Of course, the LP model solver 234A or 234B may similarly execute additional iterations to also apply a random order of items, for example.

Figure 9:
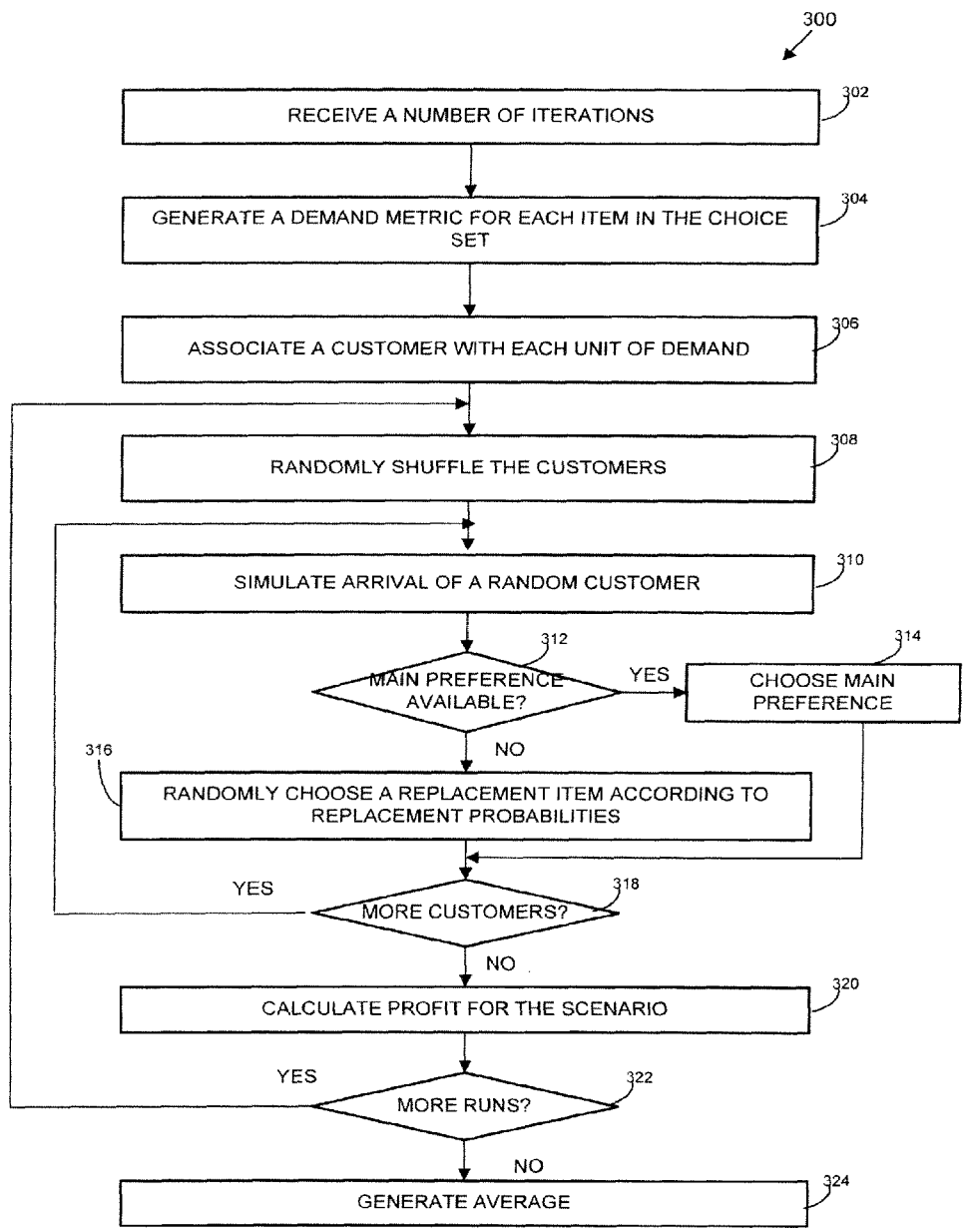
FIG. 9 is a flow diagram of an example method which the combinatorial problem solver illustrated in FIG. 7 may implement to generate a profitability model using a simulation technique.

Next, FIG. 9 depicts a flow diagram of an example method 300 which one of the simulators 236 or 238 may implement to generate a profit model based on simulated behavior of each customer. In general, the simulators 236 or 238 may model the behavior of a group of hypothetical customers by simulating a scenario according to which customers enter a retail area (such as the retail area 10) in a random order, purchase a unit of the preferred item if one is available, and select a replacement item subject to certain conditions or probabilities. By repeating the scenario several times, the simulators 236 or 238 may improve the reliability of the generated profit metrics.

In particular, the simulators 236 or 238 may receive a number of iterations of the simulation scenario at block 302. At block 304, the simulators 236 or 238 may generate an estimated demand for each item in the choice set. To this end, the simulators 236 or 238 may obtain some or all of the mean, average, standard deviation, variance, etc. from the distribution module 240 which may implement normal distribution, for example. The demand for the corresponding item may then be generated using any suitable statistical technique. The simulators 236 or 238 may then associate each generated demand with a corresponding number of customers. For example, if the demand of 20 generated for a certain item at block 304, the simulators 236 or 238 may generate 20 customers at block 306 (by incrementing a total customer counter by 20, by allocating memory for 20 customers, or in any other suitable manner). Upon generating a simulated set of customers, each associated with a certain preference for one of the items in the choice set, the simulators 236 or 238 may randomly shuffle the customers at block 308 and begin to simulate an arrival of the customers to a store in which the choice set is being displayed. Referring back to FIG. 7, the simulators 236 or 238 may utilize the random number generator 242 to shuffle the customers.

As indicated above, the optimization system 50 may store or derive average, standard deviation, and other metrics related to sales statistics for each item. To continue with the example set of items 24A-C, the corresponding historical sales data may include the following parameters:

TABLE 7

| Item | Average ($\mu$) | Min | Max |
|------|-----------------|-----|-----|
| 24A  | 10              | 3   | 15  |
| 24B  | 3               | 0   | 8   |
| 24C  | 12              | 2   | 18  |

Thus, the item 24A for example sells at least 3 units and at most 15 units, and 10 on average. Assuming normal distribution $N(\mu_i, \sigma_i^2)$, the standard deviation $\sigma_i$ can be expressed as $$\sigma = \tfrac{1}{4}(\max_i - \min_i) \quad \text{(Equation 9)}$$

Accordingly, the distribution of the items 24A-C corresponds to the following parameters:

TABLE 8

| Item | $\mu$ | $\Sigma$ | $\sigma^2$ |
|------|-------|----------|------------|
| 24A  | 10    | 3        | 9          |
| 24B  | 3     | 2        | 4          |
| 24C  | 12    | 4        | 16         |

Referring back to FIG. 7, the historical sales data supplied to each of the modules 234A-238 in some embodiments may be similar to the data in Table 7, Table 8, or both. Further, in an embodiment, the data listed in Table 8 is used in deriving the matrix $DTM_{LP}$ discussed above with reference to the LP model solvers 234A and 234B.

Referring again to FIG. 9, the arrival of one customer from the randomly shuffled group is simulated at block 310, and the selection of an item by the customer is simulated at blocks 312-316. Because each customer is associated with a certain preference, the simulators 236 or 238 first attempt to satisfy the customer's preference at block 312 and, if the preferred item is available, simulate the transaction at block 314. If, on the other hand, the preferred item is not available, a replacement item is selected at block 316 using the random number generator 242 and transfer probability metrics. A decision to purchase the preferred or one of the replacement items at blocks 314 or 316 may be represented by incrementing a corresponding counter, for example.

More specifically, the full replacement simulator 236 may implement the assumption that the a customer will always purchase a replacement item if the preferred item is not available. A weighed random selector (a "roulette") may define a plurality of weighed choices, each of which may be regarded as a region on a roulette wheel. The size of each region may be proportional to the probability of replacement of the preferred item by the item associated with the region. Because one of the regions must be selected, the full replacement simulator 236 always selects a replacement item (as long as supplies last). By contrast, the partial replacement simulator 238 may include empty windows which, when selected, correspond to the event that the customer does not make any purchase at all. Thus, a 40% probability of replacing item a with item b may be simulated by a window of size 4 associated with item b and an empty window of size 6.

At block 318, the simulator 236 or 238 may check whether more customer selections must be simulated during the given run and return to block 310 if the customer list has not yet been exhausted. If, however, the entire group of customers has been processed, the simulator 216 or 238 may proceed to calculating the profit for the executed scenario at block 320. Similar to the corresponding block of the LP technique discussed above, the profit may be calculated by summing up the selected units for each item and multiplying the resulting number of the unit profit metric.

At block 322, the simulator 236 or 238 may decide to repeat the execution of at least some of the blocks 308-320 if the number of iterations specified at block 302 has not yet been performed. Otherwise, the average for the multiple iterations is calculated at block 324.

Next, Table 9 illustrates the results generated by the combinatorial problem solver 230 in several modes of operation and for various facings of the items 24A-C. In particular, column $profit^{min}_{LP}$ lists the results generated by the LP model solver 234A, implementing the more optimistic assumption (2a) and using the list of items sorted in an ascending order of unit profit; column $profit^{max}_{LP}$ lists the results generated by the LP model solver 234A, implementing the same assumption (2a) and using the list of items sorted in a descending order of unit profit; and column $profit^{avg}_{LP}$ lists the corresponding averages. Further, column $profit_{SF}$ lists the results of simulation generated by the full replacement simulator 236, and column $profit_{SP}$ lists the results of simulation generated by the partial replacement simulator 238.

view of the spatial constraints (and possibly business rules) associated with the retail space.

Figure 10:
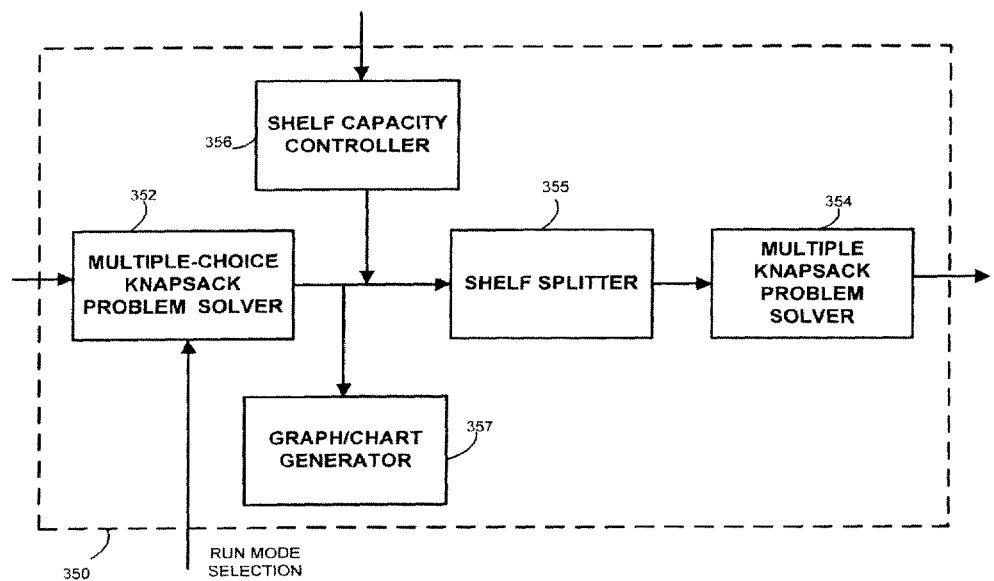
FIG. 10 is a block diagram of an example knapsack problem solver which may be utilized by the combinatorial problem solver illustrated in FIG. 2.

Now referring to FIG. 10, a combinatorial problem solver 82 illustrated in FIG. 2 may include a knapsack problem solver 350 that includes a multiple-choice knapsack solver 352, a multiple knapsack problem solver 354, a shelf splitter 355, a shelf capacity controller 356, and a graph/chart generator 357. During operation, the multiple-choice knapsack solver 352 in one mode of operation may find an optimal solution to the problem of selecting one facing from each choice set within a global space constraint, e.g., total space available in a retail area. For the retail space 10 illustrated in FIG. 1, the multiple-choice knapsack solver 352 may thus select an optimal facing from each of the choice-sets $N_1$-$N_4$ to fit within the total width of the shelves 12-14, i.e., $L_1+2*L_2$. The shelf capacity controller 356 may then supply the parameters such as the number of shelves in the retail space 10, the width of each shelf, and other relevant parameters to the shelf splitter 355 which may split the solution into shelf-specific components utilizing the multiple knapsack problem solver 354.

In an embodiment, the combinatorial problem solver 82 can operate in a fixed-constraint mode or a variable-constraint mode in accordance with a signal received via a run mode selection input. In the fixed-constraint mode, the combinatorial problem solver 230 generates an optimal solution consistent with a certain fixed constraint. In the variable-constraint mode of operation, the combinatorial problem solver 82 provides multiple solutions within a certain range or, in some cases, with no range restriction. As discussed below with reference to FIGS. 18, 19A, and 19B, the combinatorial problem solver 82 in this mode identifies an optimal profit value for each width (e.g., using discrete width value or according to any other resolution), generate a visual representation of the results using the graph/chart generator 357 so that an analyst can efficiently select a

TABLE 9

| | Facings$_{24A}$ | Facings$_{24B}$ | Facings$_{24C}$ | Width | Profit$^{min}_{LP}$ | Profit$^{max}_{LP}$ | Profit$^{avg}_{LP}$ | Profit$_{SF}$ | Profit$_{SP}$ |
|---|---|---|---|---|---|---|---|---|---|
| 1 | 0 | 0 | 2 | 8 | 80 | 80 | 80 | 78 | 76 |
| 2 | 0 | 0 | 3 | 12 | 120 | 120 | 120 | 105 | 98 |
| 3 | 0 | 1 | 2 | 11 | 115 | 115 | 115 | 111 | 105 |
| 4 | 0 | 1 | 3 | 15 | 155 | 155 | 155 | 135 | 120 |
| 5 | 1 | 0 | 2 | 13 | 152 | 152 | 152 | 147 | 144 |
| 6 | 1 | 0 | 3 | 17 | 192 | 192 | 192 | 172 | 166 |
| 7 | 1 | 1 | 2 | 16 | 187 | 187 | 187 | 173 | 166 |
| 8 | 1 | 1 | 3 | 20 | 193 | 199 | 196 | 187 | 179 |
| 9 | 2 | 0 | 2 | 18 | 215 | 215 | 215 | 178 | 169 |
| 10 | 2 | 0 | 3 | 22 | 210 | 213 | 212 | 202 | 191 |
| 11 | 2 | 1 | 2 | 21 | 195 | 203 | 199 | 190 | 186 |
| 12 | 2 | 1 | 3 | 25 | 201 | 201 | 201 | 199 | 197 |

As indicated above, the combinatorial problem input generator 81 format the data generated by the profit calculator 76 so as make the data consistent with a mathematical problem. For example, the combinatorial problem input generator 81 may generate a list of facing combinations for the set of items 24A-C using an LP technique such as those discussed above, each element in the list specifying the width and the profit of the facing combination: $List_{N1}$={ ($Width_1$=8, $Profit_1$=80), ($Width_2$=11, $Profit_2$=115), . . . } The combinatorial problem input generator 81 may generate similar lists for every choice set to ultimately generate a set of lists {$List_{N1}$, $List_{N1}$, . . . } so that the combinatorial problem solver 82 may produce an optimal assortment by selecting one facing combination from each choice set in solution for any desired width. It is noted that an analyst may find the variable-constraint mode to be useful when the width of a certain merchandizing fixture has not yet been selected or, at least, can be varied within a certain range. Further, an analyst can utilize the variable-constraint mode to quickly and efficiently identify the impact of possible gaps in shelf space (see FIG. 19B).

Figure 11:
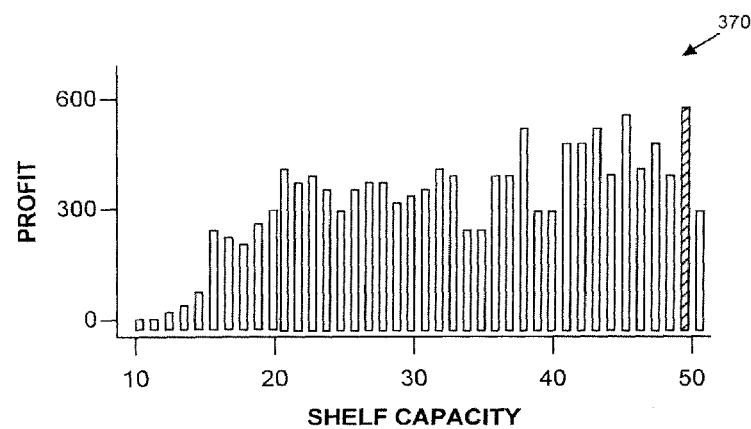
FIG. 11 is an example histogram of data which the system illustrated in FIG. 2 may generate when seeking an optimal assortment.

As one example of an approach to solving the knapsack problem which the multiple-choice knapsack solver 352 may implement when operating in the fixed-constraint mode, FIG. 11 illustrates a histogram 370 of various profit metrics associated with various spatial metrics (e.g., total shelf widths) filled to maximum capacity. For example, when considering certain choice sets $N_1$, $N_2$, and $N_3$, the knapsack problem solver 350 may during one of the iterations consider a facing combination from the choice set $N_1$ with width=18 and profit=215, a facing combination from the choice set $N_2$ with width=10 and profit=117, and a facing combination from the choice set $N_2$ with width=22 and profit=247. The resulting bar in the histogram 370 may then correspond to width 18+10+22=50 and profit 215+116+247=579. It will be noted that it is possible for profit to decrease with an increase in shelf width because less profitable items may be selected to fill the shelf. The multiple-choice knapsack solver 352 may generate the histogram 370 and identify a bar that corresponds to the highest profit within the specified shelf capacity, indicated by shading in FIG. 11. However, as explained in more detail below, the bar that corresponds to the highest profit need not necessarily represent a globally optimal assortment solution because of an additional practical requirement that the overall solution fit on several shelves (or otherwise conform to several space constraints in addition to the global constraint associated with the corresponding retail area).

Generally speaking, the multiple-choice knapsack solver 352 may solve the knapsack problem by iteratively generating all possible combinations of elements in the list supplied by the module 81, testing each combination against the constraints, and selecting the one or several combinations associated with the maximum profit. Alternatively, the multiple-choice knapsack solver 352 may implement a more efficient general mathematical solution.

Figure 12:
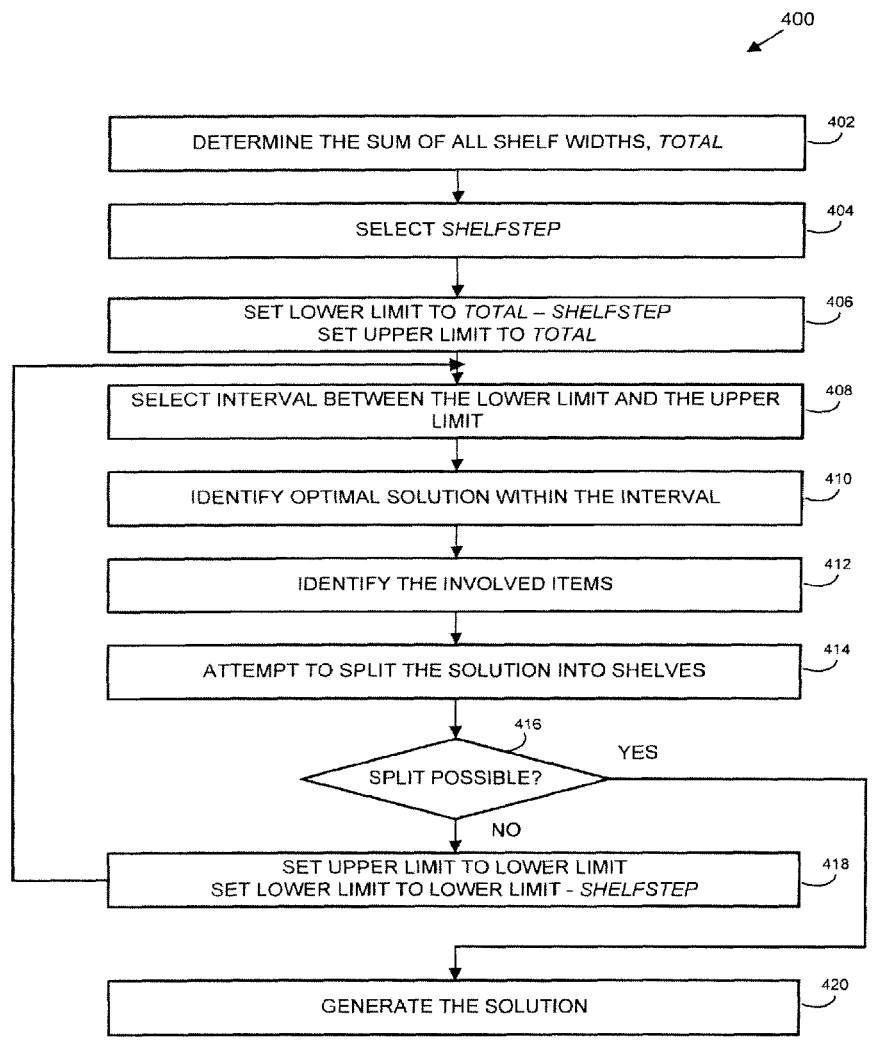
FIG. 12 is a flow diagram of an example method which the knapsack problem solver illustrated in FIG. 10 may implement to split a total-space solution into several shelves.

Referring to FIG. 12, the shelf splitter 355 depicted in FIG. 10 may implement a method 400 to split the solution generated by the multiple-choice knapsack solver 352 into several shelves. For example, the multiple-choice knapsack solver 352 may output a solution for the retail space depicted in FIG. 1 without specifying how the items 20A-26C must be split among the shelves 12-16. Thus, the multiple-choice knapsack solver 352 may supply to the shelf splitter 355 a preliminary solution for multiple item width combinations such as the histogram 370, for example. At block 402, the shelf splitter 355 may determine the sum of all shelf widths in the available retail space. In the example of the retail space, the total available shelf width is $L_1+2*L_2$ which may be, for example, 50. Next, the shelf splitter 355 may select an interval shelfstep at block 404, and select a first interval of the histogram 470 as the group of bars between 50 and 50—shelfstep at block 406. At block 408, the shelf splitter 355 may select the data in the histogram 370 in the interval selected at block 406, and identify the bar with the highest profit in the selected interval at block 410.

In at least some of the embodiments, the multiple-choice knapsack solver 352 generates a solution for a problem in which each facing item effectively defines a single element. For example, a facing combination having 2 facings of the item 24A, 1 facing of the item 24B, and 2 facing of the item 24C corresponds to a single element of width 21 and profit 199 according to one of the LP models. When generating shelf-specific solutions, the shelf splitter 355 may retrieve the association between each facing and the corresponding items at block 412. In an embodiment, the knapsack problem solver 350 may maintain a record of the following format to facilitate the operation of the shelf splitter 355:

class_id=2, item_id=15, item_desc="203", profit=30, weight=24.

In this example format, class_id identifies the choice set $N_2$, and item_id identifies a facing combination to which identity 15 has been assigned, and that includes 2 facings of item 1 from the choice set $N_2$, 0 facings of item 2 from the choice set $N_2$, and 3 facings of item 3 from the choice set $N_2$. The field class_id may be used to associate the facing combination that has several facings of several items with a single element when solving a knapsack problem. The profit of this facing combination is 30, and the total combined width of the 5 facings is 24. It will be noted that the width of the items in the choice set $N_2$, or of the facing, can be generalized to "weight" for the purposes of solving a problem in combinatorics. Thus, knapsack problem solver 350 may be similarly utilized in systems that group items according to other criteria such as physical weight, for example.

Figure 13:
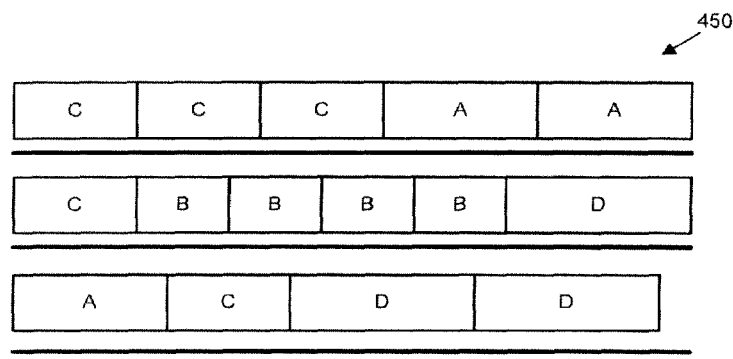
FIG. 13 is a block diagram that illustrates an example division of a solution to a space-constrained combinatorial problem into several regions such as shelves.

With continued reference to FIG. 12, the shelf splitter 355 at block 414 may attempt to split the identified most profitable solution into several shelves. If a split is possible, the shelf splitter 355 may split the solution at block 420 in cooperation with the multiple knapsack problem solver 354. In a sense, the problem to be solved at block 414 may be considered to involve several knapsacks, with the length of each shelf defining the capacity of the respective knapsack. One example solution to this problem is described by David Pisinger in "An Exact Algorithm for Large Multiple Knapsack Problems," *European Journal for Operational Research*, 114 (1999), the entire disclosure of which is expressly incorporated herein by reference. Referring to FIG. 13, it will be noted that an example splitting solution 450 may not completely fill each shelf, and that multiple facings of an item need not always be contiguous (provided splitting of facings of the same item does not violate any of the business rules).

Referring again to FIG. 12, the shelf splitter 355 may adjust the interval in which a solution is sought at block 418 if a split in the current interval is not possible. In particular, the shelf splitter 355 may move a window of size shelfstep to the left in the histogram 370. The shelf splitter 355 may then repeat the execution of blocks 408-416 until a solution is found.

From the foregoing, it will be appreciated that the assortment development engine 54 may efficiently generate profit metrics for various facing combinations, select an optimal or near-optimal assortment that will maximize the profit derived from the sale of the items, and fit the selected assortment in the general space constraint as well as within each of multiple space constraints such as widths of individual shelves, for example. Referring back to FIG. 2, the layout optimizer 66 may further improve the layout by considering positioning of items included in the assortment relative to each other. Thus, if the solution to an assortment problem specifies that 2 facings of the item 24A, 1 facing of the item 24B, and 1 facing of the item 24C are to be placed on a shelf of length $L_1$, the layout optimizer 66 may further determine at least a partial ordering of the items 24A-C on the shelf. The layout optimizer 66, in a sense, improves aesthetic qualities of the assortment. In another sense, the layout optimizer 66 reduces customer frustration in trying to locate a desired item on the shelf by improving the perceived logic behind item grouping. Both of the items 24A and 24B, to consider one example, may be boxes of diapers for one age group, while the items 24C may be boxes of diapers for another group. A customer may therefore expect to find the items 24A and 24B in relative proximity to each other, and the layout optimizer 66 may attempt to account for this and similar factors.

In operation, the layout optimizer 66 may apply business rules such as placing all facings of a certain item next to each other without breaking up the facings across multiple shelves, placing a generic product next to a brand-name product during promotions to effectively promote the generic product, maintaining a certain color scheme on a shelf, keeping same-brand items next to each other on a shelf, sequencing of items according to size (e.g., a 20-count pack before a 40-count pack), keeping high-profit items at the eye-level, etc. In some embodiments, the rules may be nested and/or hierarchical.

Generally speaking, the layout optimizer 66 may utilize any suitable optimization technique, including those known in the art. In some embodiments, the layout optimizer 66 applies simulated annealing to determine efficient grouping for the items included in an assortment, referred to herein as blocking. As is known, simulated annealing is a methodology that allows optimization to avoid being "trapped" at local minimums or maximums of a function. To this end, simulated annealing imitates the naturally occurring process of cooling a metal and, in particular, the "wandering" of atoms through energy states.

To apply simulated annealing, the layout optimizer 66 may group items according to various attributes, associate groups of items with an imaginary flexible space constraint (e.g., a rubber band) which may be two-dimensional in the examples discussed below. In other embodiments, however, the flexible space constraint may be three-dimensional or, conversely, one-dimensional in some simpler cases. The extent to which the flexible space constraint must be stretched to accommodate several items is indicative of the quality of grouping, with smaller degree of stretching being associated with better grouping of items. By way of example, FIGS. 14A-B illustrate an example group of items 460 including items 462, 464, and 466 associated with one brand, and items 470, 472, and 474 associated with another brand. Further, items 462 and 464 may be of one size, and item 466 may be of another size.

In the example arrangement of FIG. 14A, each of the flexible space constraints 480-484 encompasses respectively a group of items of the first brand (462-466), a group of items of the second brand (470-474), and a group of items of the same size of the first brand (462 and 464). It will be noted that the flexible space constraints 480-484 must be stretched far in excess of the combined area of the corresponding enclosed items because of the non-optimal arrangement of items 460-466 and 470-474. By contrast, the arrangement illustrated in FIG. 14B requires less stretching for each of the flexible space constraints 480-484. The blocking depicted in FIG. 14B may thus be regarded as more favorable, and stretching of the flexible space constraints 480-484 may be analogized to expanding effort in searching for the desired item on a shelf. It will be further noted that the flexible space constraints may be nested, hierarchical, overlapping, etc.

Figure 14C:
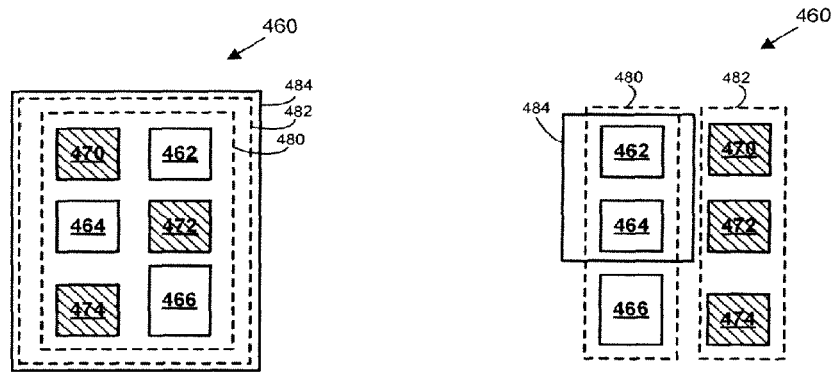
FIG. 14C is a block diagram that schematically illustrates sorting of several items within a block.
Figure 14C:
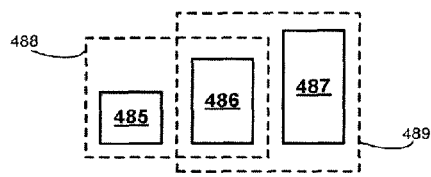

In another aspect, items within a particular group may be presented to a consumer in an ascending order, a descending order, or in any other manner a customer would find intuitively correct and comfortable. Referring to FIG. 14C, the layout optimizer 66 may generate a desired sequencing for a group of items 485, 486, and 487 by associating additional flexible space constraints 488 and 489 with the pairs 485, 486, and 486, 487. However, the amount of computation required for sequencing using flexible space constraints may be high for large numbers of items. The layout optimizer 66 accordingly may use flexible space constraints for blocking only, and apply a different sorting technique to a group of items within a particular block. For example, the layout optimizer 66 may associate each of the items 485-487 with an additional flexible metric that may correspond to a piece count of the item (e.g., a 20-count package of diapers), volume (e.g., a 12-oz bottle), weight, or any suitable other parameter, and execute a simple sort based on the single parameter using a technique such as those known in the art. Of course, the sort may also be performed on multiple parameters.

In yet another aspect, analysts may sometimes address two competing interests in developing a planogram: shoppability and profitability. For example, the principles of shoppability may dictate that a certain profitable item must be at customers' eye level to maximize purchases. On the other hand, the item may be blocked together with several other items which must be transferred to the eye level along with the item. Moreover, some shoppability factors are not quantifiable and require aesthetic or artistic judgment of an analyst.

Figure 15:
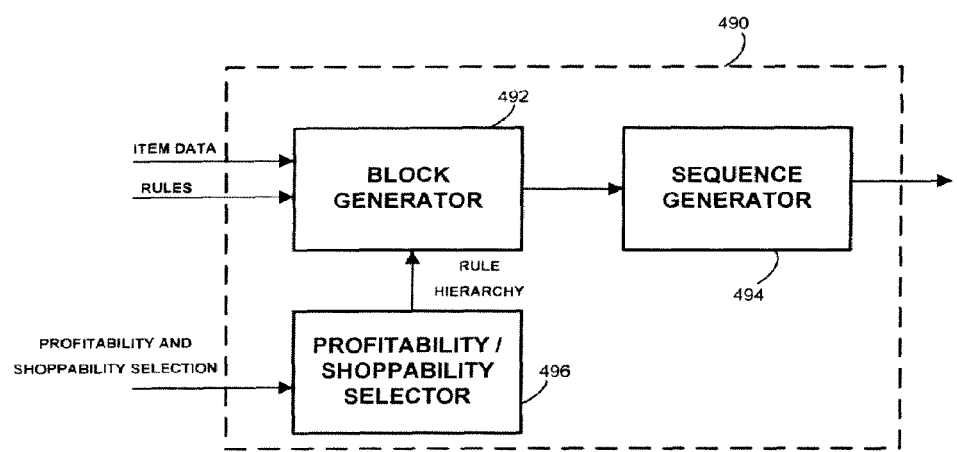
FIG. 15 is a block diagram of an example optimizer which may be utilized by the layout optimizer solver illustrated in FIG. 2.

One example of an optimizer that may be used by the layout optimizer 66 to facilitate the balancing between shoppability and profitability, as well as implement blocking and sequencing discussed above, is illustrated in FIG. 15. An optimizer 490 may include a block generator 492, a sequence generator 494, and a profitability/shoppability selector 496. The optimizer 490 may receive as input item data, business rules, and an indication of how business rules are to be applied. Referring back to FIG. 2, the terminal stations 58A-B may support a user interface to adjust the importance of shoppability relative to profitability, so that a rule such as "item X must be at eye level" may receive a higher or lower priority relative to a rule such as "profitability must not be lower than Y." In response to the user input, the profitability/shoppability selector 496 may generate an appropriate ordering of business rules, and the modules 492 and 494 may block and sequence items as discussed above. In this manner, the optimizer 490 can generate a layout using a holistic approach.

Figure 16:
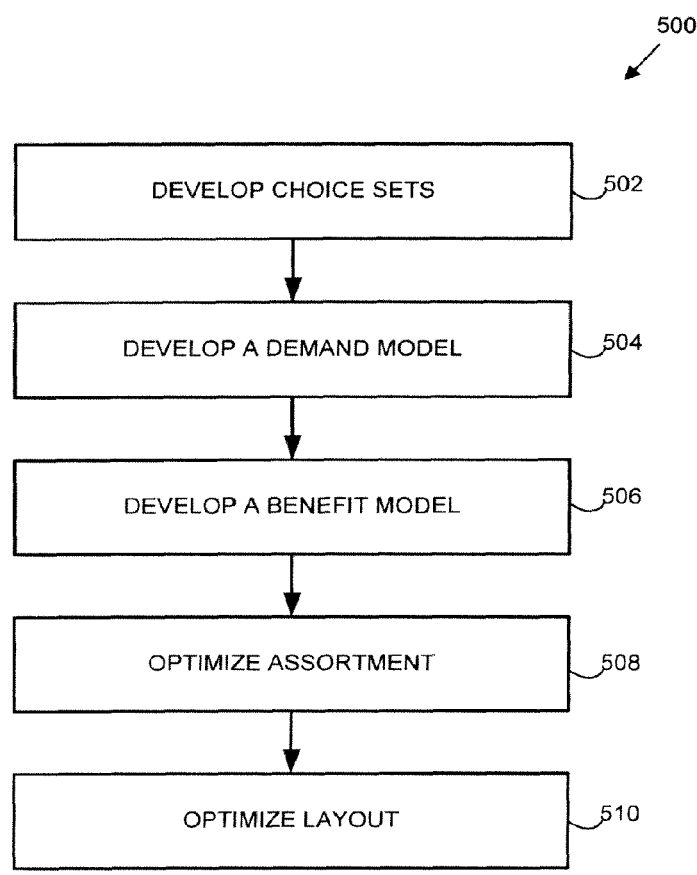
FIG. 16 is a flow diagram of an example method for generating an efficient assortment of items.

In view of the discussion of FIGS. 1-15, it will be appreciated that the optimization system 50 can accurately and efficiently generate a profitable item assortment consistent with a set of business rules, and optimize or facilitate optimization of a layout of these items. Referring to FIG. 16, an example of a method which the optimization system 50 may implement to generate assortment and an item layout is illustrated as a high-level flow diagram 500. As described in the diagram 500, the optimization system 50 may develop several choice sets at block 502, develop a demand model for each choice set at block 504, generate a benefit model (such as a profit model discussed above with reference to FIG. 7) at block 506, and optimize assortment using the benefit model and width metrics of each facing combination (or other metrics, if desired) in view of business rules (block 508). At block 510, the optimization system 50 may optimize the layout of the generated item assortment using the layout optimizer 66, for example.

Figure 17:
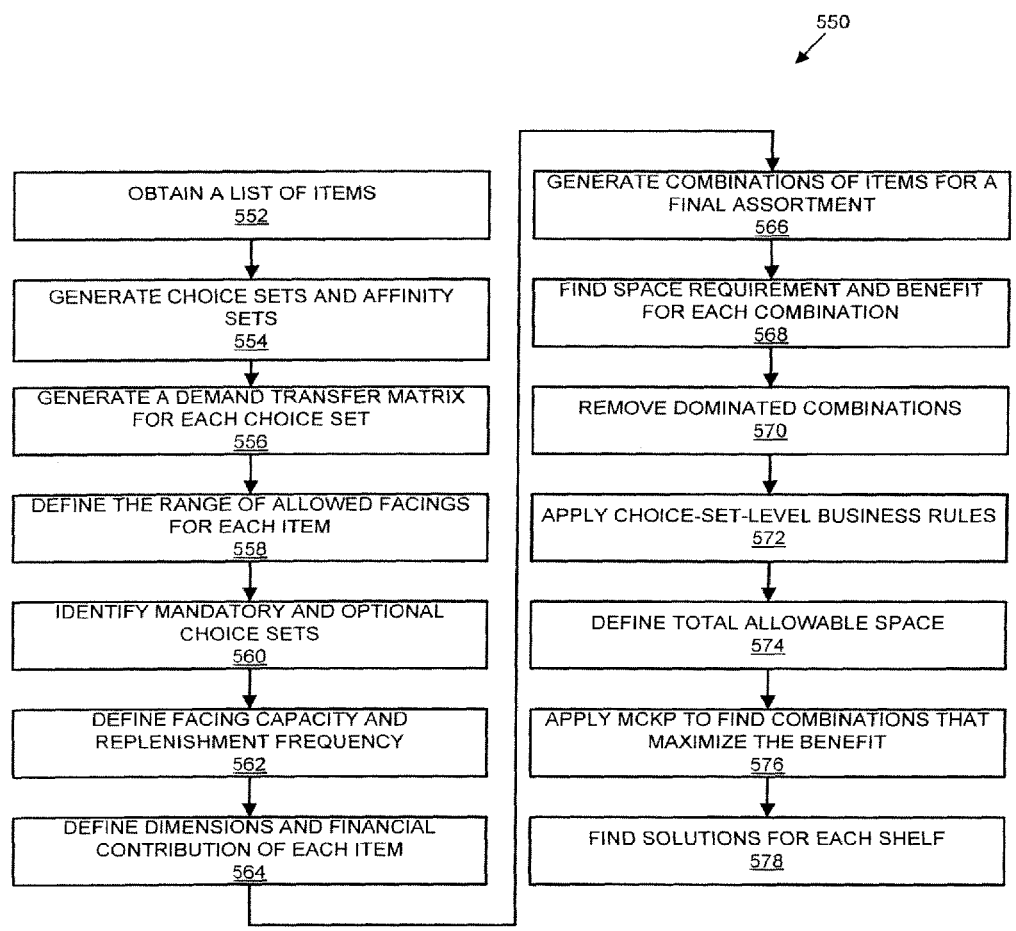
FIG. 17 is another flow diagram of an example method for generating an efficient assortment of items.

Additionally, FIG. 17 provides a diagram of an example method 550 for generating an assortment of several items, which may partially overlap with some of the blocks 502-508 illustrated in FIG. 17. Thus, at block 552, the optimization system 50 may obtain a list of items from one or several files, user interface of the terminals 58A-B, via the network 64, or in any other suitable manner. The optimization system 50 may then generate choice sets and affinity sets at block 554 in response to user input which may be received via graphical or text interface of the terminals 58A-B, for example. Alternatively, the input data provided to the optimization system 50 may specify choice sets and affinity sets using dedicated flags, organized lists each corresponding to a certain set, etc. For each choice set, the optimization system 50 may generate a DTM using the techniques discussed above (block 556). Additionally or alternatively, an analyst may receive or derive transfer probabilities from the survey, syndicated, and other historical sales data, and the optimization system 50 may automatically generate DTMs using the respective probability metrics.

At blocks 558-564, the optimization system 50 may receive a set of constraints such as number of allowable facings for each item, business rules such as those that specify whether a certain item is mandatory or optional, spatial and operational parameters for each item such as facing capacity and replenishment frequency, and other spatial and financial parameters, as well as aesthetic criteria expressed as business rules.

The optimization system 50 may then generate facing combinations for each choice set (block 566), determine a space requirement and a corresponding benefit metric for each combination (block 568) using one or several of suitable linear programming or simulation techniques. Next, dominated and/or same-valued combinations may be removed at block 570, and additional business rules may be applied at block 574 to detect invalid choice set combinations, for example. However, in other embodiments choice-set-level business rules may be applied at an earlier stage. At block 574, the optimization system 50 may define the total space available in the retail area. In the example illustrated in FIG. 1, the space area 10 includes several shelves. In general, the retail area may be any area such as the floor of a supermarket, the holding area of a vending machine, etc.

The optimization system 50 may then format the generated data so as to make the data compatible with a generic optimization problem. In one embodiment, the optimization system 50 generates a first data file that list every facing combination along with a corresponding metric (e.g., width, profit, etc.) as a single element, and generates a second data file that retains the associated between every facing combination and the facings of items included in the facing combination. The problem may then be solved mathematically or programmatically in an exact or approximate manner. For example, the first data file may define an input to a knapsack problem, and the output of the knapsack problem may be further split into several smaller areas using a suitable technique for solving a multiple knapsack problem (blocks 576-578).

Next, several additional techniques, which the assortment development engine 54 implements in some embodiments, are discussed with reference to FIGS. 18-20B. First referring to FIG. 18, a module such as the knapsack problem solver 350 (see FIG. 10) can generate a graph 600 to facilitate efficient selection of a combination of items when the width of a merchandizing fixture is variable within a certain range or is not limited at all. In particular, the graph 600 illustrates net profit associated with a combination of items (the y axis) plotted against width of the combination (the x axis) using the data listed Table 4. Thus, each point in the graph 600 (or outside the graph 600) is a {width, net profit} tuple that corresponds to the Total Width and Net Profit Total columns of the respective row of Table 4, for example, or another data set. Point 602 in this example represents the maximum profit when the width is 2, point 604 represents the highest net profit for any width listed in Table 4, and point 606 represents a less-than-optimal profit for the width 4, for example. In an embodiment, the assortment development engine 54 generates the graph 600 by drawing connecting lines between maximum values for each combination. It is noted that in this example, there are no maximum values that are less than a maximum value of a combination with a smaller width.

Figure 19A:
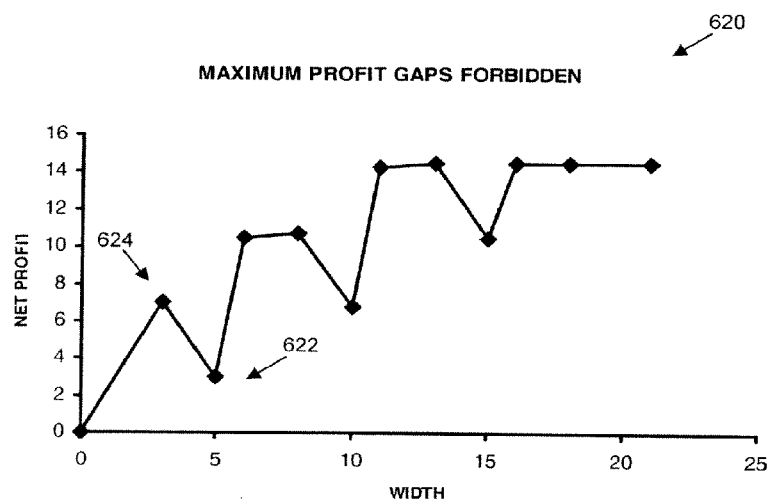
FIG. 19A is a graph that illustrates, for another pair of example items, the relationship between the net profit associated with the sale of the items and the total width occupied by the items, if a rule that forbids gaps on an occupied merchandizing fixture is applied.

By contrast, FIG. 19A illustrates a graph 620 that corresponds to a pair of items a and b such that the width of a is 3 and the width of b is 5. Using the techniques discussed above, and using the parameters and business rules specified in Table 3, the data listed below in Table 10 can be generated:

TABLE 10

| Facings A | Facings B | Total Width | Units of A Sold | Units of B Sold | Rev. from A | Rev. from B | Gross Profit from A | Gross profit from B | Net Profit from A | Net Profit from B | Units Total | Rev. Total | Gross Profit Total | Net Profit Total |
|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 |
| 1 | 0 | 3 | 10 | 0 | 30 | 0 | 10 | 0 | 7 | 0 | 10 | 3 | 10 | 7 |
| 0 | 1 | 5 | 0 | 4 | 0 | 16 | 0 | 4 | 0 | 3 | 4 | 16 | 4 | 3 |
| 2 | 0 | 6 | 15 | 0 | 45 | 9 | 15 | 0 | 10.5 | 0 | 15 | 45 | 14 | 10.5 |
| 1 | 1 | 8 | 10 | 5 | 30 | 20 | 10 | 5 | 7 | 3.75 | 15 | 50 | 15 | 10.75 |
| 0 | 2 | 10 | 0 | 9 | 0 | 36 | 0 | 9 | 0 | 6.75 | 9 | 36 | 9 | 6.75 |
| 2 | 1 | 11 | 15 | 5 | 45 | 20 | 15 | 5 | 10.5 | 3.75 | 20 | 65 | 20 | 14.25 |
| 1 | 2 | 13 | 10 | 10 | 30 | 40 | 10 | 10 | 7 | 7.5 | 20 | 70 | 20 | 14.5 |
| 0 | 3 | 15 | 0 | 14 | 0 | 56 | 0 | 14 | 0 | 10.5 | 14 | 56 | 14 | 10.5 |
| 2 | 2 | 16 | 12 | 8 | 36 | 32 | 12 | 8 | 8.4 | 6 | 20 | 68 | 20 | 14.5 |
| 1 | 3 | 18 | 10 | 10 | 30 | 40 | 10 | 10 | 7 | 7.5 | 20 | 70 | 20 | 14.5 |
| 2 | 3 | 21 | 12 | 8 | 36 | 32 | 12 | 8 | 8.4 | 6 | 20 | 68 | 20 | 14.5 |

To generate the graph 620 using the data listed in Table 10, the assortment development engine 54 applies a rule that forbids gaps on an occupied merchandizing fixture. Thus, for a shelf of width 5, point 622 must be selected even though point 624, associated with a smaller width 4, corresponds to a higher profit. If, on the other hand, the knapsack problem solver 350 applies a rule that allows gaps on an occupied merchandizing fixture, the point 622 is not used in the generated solution, i.e., a graph 630 illustrated in FIG. 19B. Thus, depending on whether the analyst selects a business rule that allows gaps between items occupying a merchandizing fixture, different solutions can be generated.

Figure 18:
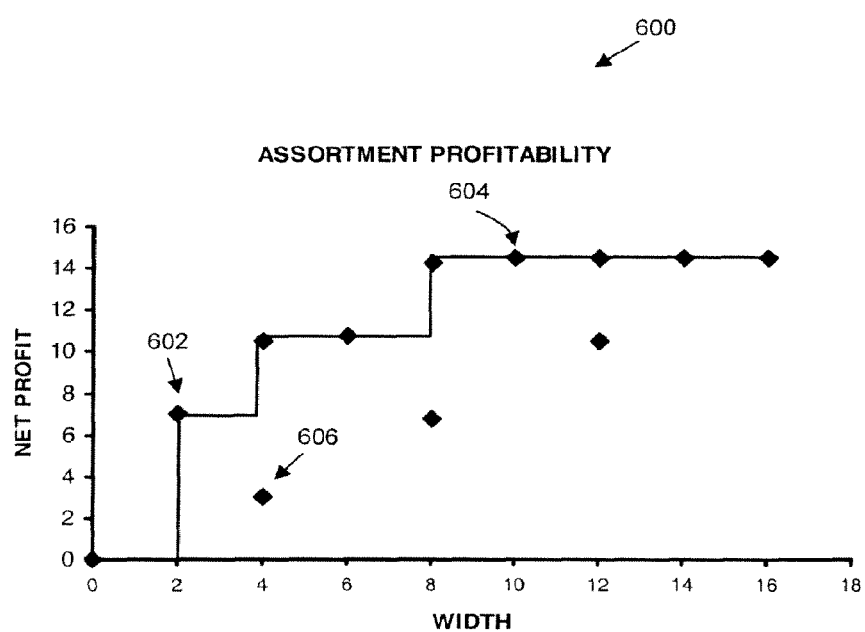
FIG. 18 is a graph that illustrates, for an example pair of items, the relationship between the net profit associated with the sale of the items and the total width occupied by the items.
Figure 19B:
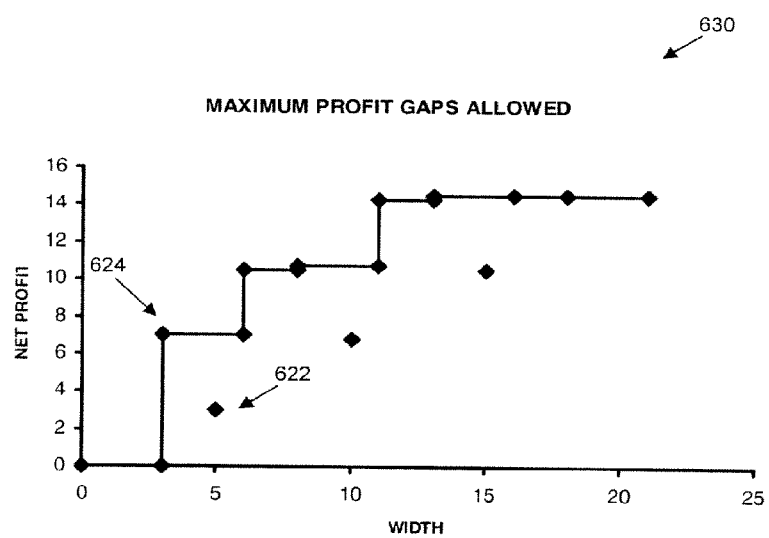
FIG. 19B is a graph that illustrates, for the pair of items of FIG. 19A, the relationship between the net profit associated with the sale of the items and the total width occupied by the items, if a rule that allows gaps on an occupied merchandizing fixture is applied

In general, FIGS. 18, 19A, and 19B illustrate an approach to generating profit metrics for different total widths in view of different rules. An analyst can use the graphs 600, 620, and 630 to determine the amount of profit associated with a certain combination prior to applying spatial restrictions. Further, this techniques is particularly useful when small discrepancies between the size of a merchandizing fixture and the total width of a combination are tolerable. For example, in some situations, a 20-inch fixture can accommodate items with the combined width of 21 inches if some of the items can be easily compressed (e.g., packs of diapers, rolls of paper towels, etc.). Similarly, a relatively small gap is tolerable is some situations, and it is acceptable to utilize a 20-inch fixture to display items with the combined width of only 17 inches, for example.

Figure 20A:
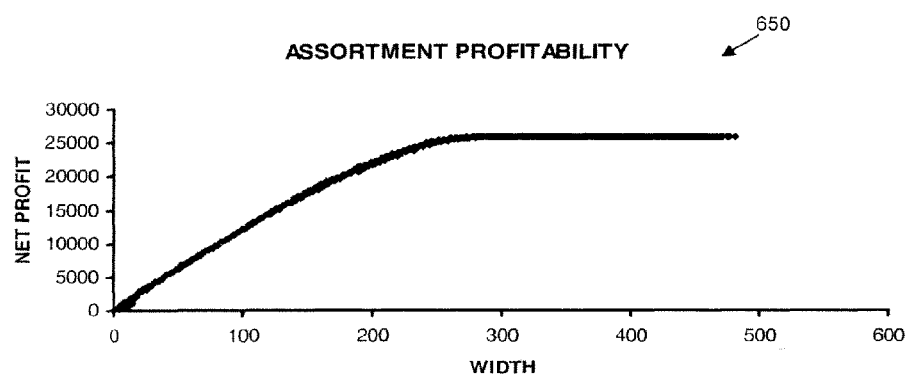
FIG. 20A is a graph that illustrates, for another group of items, the relationship between the net profit associated with the sale of the items and the total width occupied by the items.

In an embodiment, the assortment development engine 54 further supports a near-optimal mode of operation, in which an analyst or a pre-defined rule can specify a range within which a near-optimal solution can be located. Referring to FIG. 20A, a graph 650 illustrates, for a certain group of 29 items, the relationship between the net profit associated with the sale of the items and the total width occupied by the items. It is noted that the graph 650 is a curve that displays diminishing returns as the width increases, and that the graph 650 reaches a point beyond which no further profit is possible.

Figure 20B:
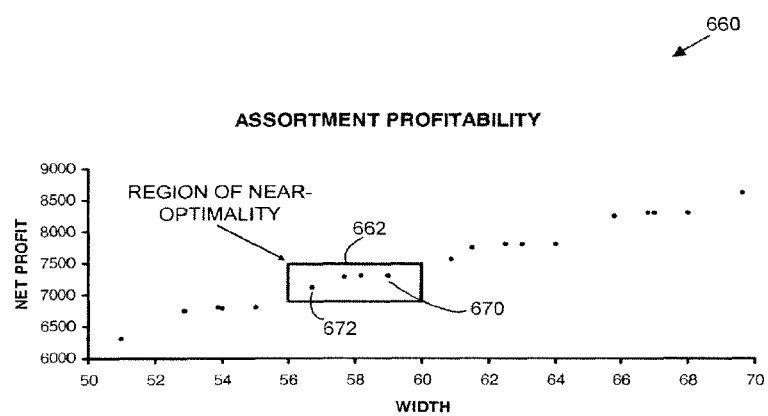
FIG. 20B illustrates selection of a region of near-optimality for an enlarged section of the graph illustrated in FIG. 20A.

Now referring to graph 660 illustrated in FIG. 20B and corresponding to an enlarged portion of the graph 650, the assortment development engine 54 in an embodiment identifies the closest solution for a given width, receives dimensions of a region of near-optimality (depicted in FIG. 20B as a box 662), automatically identifies an optimal solution within the specified region of near-optimality, and iteratively adjusts the region of near-optimality until a solution acceptable in view of other business rules is found. For some types of items, the region of near-optimality can exceed the total available width of the merchandizing fixtures if the items are compressible, as discussed above. For other items, the region of near-profitability cannot exceed the total available width. In this example, the analyst wishes to optimize the assortment to fit on several merchandizing fixtures with the combined width of 60. The closest initial solution, represented in FIG. 20B as point 670, corresponds to the width of 59, and, in an embodiment, the assortment development engine 54 can specify the point 670 to the analyst. However, it may not be possible to fit the combination that corresponds to the point 670 on the individual merchandizing fixtures without violating one or more business rules (e.g., a requirement that related items be placed together on the same shelf) or having an item go over the boundary of an individual merchandizing fixture. Accordingly, the assortment development engine 54 can automatically reject the point 670 upon applying one or more relevant rules and proceed to search within the region of near-optimality until a suitable solution can be found. In this example, the suitable solution corresponds to point 672 that is associated with the profit metric relatively proximate to the profit metric of the point 670.

In general, the region of near-optimality can be defined by a vertical dimension (i.e., a profit margin), a horizontal dimension (i.e., a gap or overfill/compression margin), or both. Thus, the region of near optimality can be defined by specifying how far, in dollars or other currency, an acceptable solution can be to the initial solution for the given combined width (in this example, the point 670). In visual terms, this approach corresponds to configuring the box 662 with a finite, rigid height and an elastic width. In other situations, the region of near optimality can be defined by the largest tolerable gap or the largest tolerable compression, and accordingly correspond to configuring the box 662 with a finite width and an elastic height.

It is noted that the assortment development engine 54 need not generate a graphical representation of the data illustrated in FIGS. 20A and 20B, or visually illustrate the process of iteratively adjusting the region of near-optimality. However, the assortment development engine 54 may display the graphs 650 and 660 on the screen of the workstation 58A or 58B, for example, in response to a request from the analyst or another user.

Figure 21:
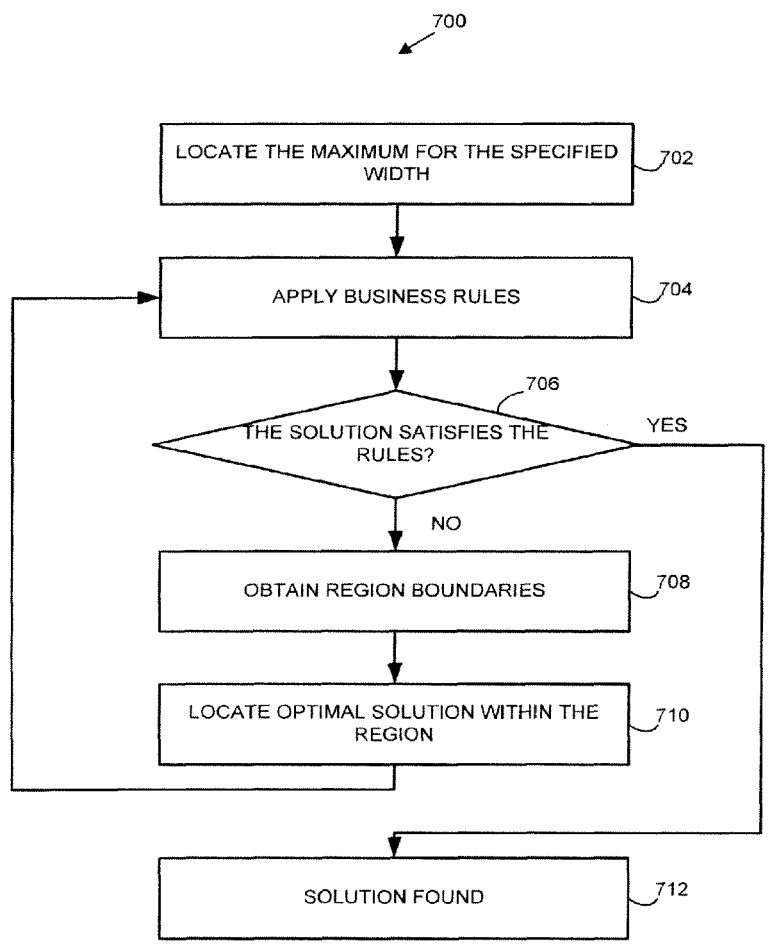
FIG. 21 is a flow diagram of an example method for generating a near-optimal solution.

Next, FIG. 21 illustrates a flow diagram of a method 700 which the assortment development engine 54 can implement to support locating a solution within a region of near-optimality. In accordance with the method 700, a maximum solution for a certain width is located at block 702, and appropriate business rules are applied at block 704. If it is determined at block 706 that the initial solution does not satisfy one or more rules, region boundaries (e.g., a vertical limit, a horizontal limit, both) are received from a user or from a pre-defined rule at block 708, and an optimal solution is located within the specified boundaries (block 710). The optimal solution is then tested using the business rules (the blocks 704 and 706) and, if the solution satisfies every rule, the method completes at block 712.

While the present system and methods have been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. A method in a computer system for selecting an efficient combination of items for placement on a merchandizing fixture, wherein each item has a respective size, and wherein each combination of items has a respective profitability metric, the method comprising:

electronically receiving, at an assortment development engine, an indication of a size of the merchandizing fixture;

electronically receiving, at the assortment development engine, a list of two or more items to be disposed on the merchandizing fixture;

electronically providing, by the assortment development engine via a user interface, for each of a plurality of widths of combinations of items, an indication of a respective profitability metric when a business rule indicates that gaps on the merchandizing fixture are allowed and an indication of a respective profitability metric when a business rule indicates that gaps on the merchandizing fixture are not allowed;

electronically receiving, at the assortment development engine via the user interface from a user of the user interface in response to electronically providing the indications of the respective profitability metrics via the user interface, a selection of one of the business rule that indicates that gaps on the merchandizing fixture are allowed or the business rule that indicates that gaps on the merchandizing fixture are not allowed, the one of the business rule that indicates that gaps on the merchandizing fixture are allowed or the business rule that indicates that gaps on the merchandizing fixture are not allowed being selected using the user interface;

electronically receiving, at the assortment development engine, for each of a plurality of combinations of items, an indication of respective profitability as a profitability metric, each indication of respective profitability being derived using individual item profitability and using item interaction data indicative of a probability of transferring customer demand between items in each of a plurality of subsets of items included in the respective one of the plurality of combinations of items;

when the business rule that indicates that gaps on the merchandizing fixture are allowed is selected via the user interface, automatically selecting by the assortment development engine a combination of items that (i) has a highest profitability metric, (ii) includes at least one facing of each item included in the list, and (iii) fits on the merchandizing fixture without occupying the entire merchandizing fixture, including applying, using the assortment development engine, a rule that allows gaps on the merchandizing fixture to select the combination of items that has the highest profitability metric and that includes at least one facing of each item included in the list, the selected combination of items being one of the plurality of combinations of items;

when the business rule that indicates that gaps on the merchandizing fixture are not allowed is selected via the user interface, automatically selecting by the assortment development engine a combination of items that (i) has a highest profitability metric, (ii) includes at least one facing of each item included in the list, and (iii) occupies the entire merchandizing fixture without exceeding the size of the merchandizing fixture, including applying, using the assortment development engine, a rule that forbids gaps on the merchandizing fixture to avoid selecting a combination of items that has a highest profitability metric but that does not occupy the entire merchandizing fixture and to select the combination of items that (i) has the highest profitability metric, (ii) includes at least one facing of each item included in the list, and (iii) occupies the entire merchandizing fixture without exceeding the size of the merchandizing fixture, the selected combination of items being one of the plurality of combinations of items; and providing, by the assortment development engine via the user interface, an indication of the selected combination of items to the user of the user interface so that the one of the plurality of combinations of items that includes at least one facing of each item included in the list and has the highest profitability metric of the combinations of items in the plurality of combinations of items that satisfy the selected business rule is placed on the merchandizing fixture.

2. The method of claim 1, wherein the list is a first list, the method further comprising receiving a second list of one or more optional items, wherein the selected combination of items includes zero or more facings of each item included in the second list.

3. The method of claim 1, further comprising receiving, for each item included in the list, an indication of a maximum number of facings of the item to be disposed on the merchandizing fixture.

4. The method of claim 1, further comprising receiving an indication of a maximum size of a gap allowed on the merchandizing fixture when the business rule that indicates that gaps are allowed is selected.

5. A method in a computer system for selecting an efficient combination of items for placement on a merchandizing fixture, the method comprising:

electronically receiving, at an assortment development engine, item profitability data that indicates, for each of a plurality of combinations of items, respective size and respective profitability, each respective profitability being derived using individual item profitability and using item interaction data indicative of a probability of transferring customer demand between items in each of a plurality of subsets of items included in the respective one of the plurality of combinations of items;

electronically receiving, at the assortment development engine, a plurality of possible sizes of the merchandizing fixture;

electronically receiving, at the assortment development engine, a list of two or more items to be disposed on the merchandizing fixture;

electronically providing, by the assortment development engine via a user interface, for each of the plurality of possible sizes of the merchandizing fixture, an indication of a respective profitability when a business rule indicates that gaps on the merchandizing fixture are allowed and an indication of a respective profitability when a business rule indicates that gaps on the merchandizing fixture are not allowed;

selecting by the assortment development engine, from among the plurality of combinations of items, a respective candidate combination of items for each of the plurality of possible sizes of the merchandizing fixture, including receiving, via the user interface from a user of the user interface in response to electronically providing the indications of respective profitability via the user interface, a selection of one of the business rule that indicates that gaps on the merchandizing fixture are allowed or the business rule that indicates that gaps on the merchandizing fixture are not allowed and applying the selected business rule, wherein each candidate combination of items (i) fits on the merchandizing fixture for the corresponding size, (ii) includes at least one facing of each item included in the list, and (iii) has a highest profitability among those of the plurality of combinations of items that fit on the merchandizing fixture for the corresponding size in accordance with the selected business rule, the one of the business rule that indicates that gaps on the merchandizing fixture are allowed or the business rule that indicates that gaps on the merchandizing fixture are not allowed being selected using the user interface, wherein applying the selected business rule includes applying, using the assortment development engine, a rule that allows gaps on the merchandizing fixture to select the respective candidate combinations of items when the business rule that indicates that gaps on the merchandizing fixture are allowed is selected and applying, using the assortment development engine, a rule that forbids gaps on the merchandizing fixture to avoid selecting a respective candidate combination of items that has a highest profitability metric but that does not occupy the entire merchandizing fixture for the corresponding size and to select a respective candidate combination of items that (i) has a highest profitability metric, (ii) includes at least one facing of each item included in the list, and (iii) occupies the entire merchandizing fixture for the corresponding size without exceeding the corresponding size;

selecting by the assortment development engine, from among the candidate combinations of items, a combination of items with a highest profitability and that includes at least one facing of each item included in the list; and providing, by the assortment development engine via the user interface, an indication of the selected combination of items to the user of the user interface so that the one of the plurality of combinations of items that includes the at least one facing of each item included in the list and has the highest profitability of the combinations of items in the plurality of combinations of items that (i) fit on the merchandizing fixture for one of the plurality of possible sizes of the merchandizing fixture and (ii) satisfy the selected business rule is placed on the merchandizing fixture.

6. The method of claim 5, further comprising receiving an indication of a maximum size of a gap allowed on the merchandizing fixture when the business rule that indicates that gaps are allowed is selected.

7. The method of claim 5, wherein the size of the merchandizing fixture corresponds to a width of the merchandizing fixture.

8. The method of claim 5, further comprising generating a plot for display on a display device, including displaying a plurality of data points, each corresponding to one of the candidate combinations.

9. The method of claim 8, including plotting profitability on a vertical axis versus merchandizing fixture size on a horizontal axis.

10. A system for selecting an efficient combination of items for placement on a merchandizing fixture, the system comprising:
one or more processors;
a first computer-readable medium storing profitability and size data for a plurality of items; and
an assortment development engine including a second computer-readable medium storing instructions that specially configure the one or more processors such that, when executed on the one or more processors, the instructions cause the one or more processors to:
receive an indication of a size of merchandizing fixture,
receive a list of two or more of the plurality of items to be disposed on the merchandizing fixture,
provide, via a user interface, for each of a plurality of widths of combinations of items, an indication of a respective profitability metric when a business rule indicates that gaps on the merchandizing fixture are allowed and an indication of a respective profitability metric when a business rule indicates that gaps on the merchandizing fixture are not allowed,
receive, via the user interface from a user of the user interface in response to providing the indications of the respective profitability metrics via the user interface, a selection of one of the business rule that indicates that gaps on the merchandizing fixture are allowed or the business rule that indicates that gaps on the merchandizing fixture are not allowed, the one of the business rule that indicates that gaps on the merchandizing fixture are allowed or the business rule that indicates that gaps on the merchandizing fixture are not allowed being selected using the user interface,
receive, for each of a plurality of combinations of items, an indication of respective profitability as a profitability metric, each indication of respective profitability being derived using the profitability data for the plurality of items and using item interaction data indicative of a probability of transferring customer demand between items in each of a plurality of subsets of items included in the respective one of the plurality of combinations of items,
when the business rule that indicates that gaps on the merchandizing fixture are allowed is selected, automatically select a combination of items that (i) has a highest profitability metric, (ii) includes at least one facing of each item included in the list, and (iii) fits on the merchandizing fixture without occupying the entire merchandizing fixture, including applying a rule that allows gaps on the merchandizing fixture to select the combination of items that has the highest profitability metric and that includes at least one facing of each item included in the list, the selected combination of items being one of the plurality of combinations of items,
when the business rule that indicates that gaps on the merchandizing fixture are not allowed is selected, automatically select a combination of items that (i) has a highest profitability metric, (ii) includes at least one facing of each item included in the list, and (iii) occupies the entire merchandizing fixture without exceeding the size of the merchandizing fixture, including applying a rule that forbids gaps on the merchandizing fixture to avoid selecting a combination of items that has a highest profitability metric but that does not occupy the entire merchandizing fixture and to select the combination of items that (i) has the highest profitability metric, (ii) includes at least one facing of each item included in the list, and (iii) occupies the entire merchandizing fixture without exceeding the size of the merchandizing fixture, the selected combination of items being one of the plurality of combinations of items, and
provide, via the user interface, an indication of the selected combination of items to the user of the user interface so that the one of the plurality of combinations of items that includes at least one facing of each item included in the list and has the highest profitability metric of the combinations of items in the plurality of combinations of items that satisfy the selected business rule is placed on the merchandizing fixture.

11. The system of claim 10, wherein the instructions, when executed on the one or more processors, further cause the one or more processors to receive an indication of a maximum size of a gap allowed on the merchandizing fixture when the business rule that indicates that gaps are allowed is selected.

12. The system of claim 10, further comprising:
a display device,
wherein the instructions, when executed on the one or more processors, further cause the one or more processors to generate a plot.

* * * * *